United States Patent [19]
Semler et al.

[11] Patent Number: 5,825,326
[45] Date of Patent: Oct. 20, 1998

[54] REAL-TIME HIGH-ACCURACY DETERMINATION OF INTEGER AMBIGUITIES IN A KINEMATIC GPS RECEIVER

[75] Inventors: James Russell Semler, Tustin; Earl Clare Thorndyke, Jr., Claremont, both of Calif.

[73] Assignee: Interstate Electronics Corporation, Anaheim, Calif.

[21] Appl. No.: 679,454

[22] Filed: Jul. 9, 1996

[51] Int. Cl.$^6$ .............................. G01S 5/02; H04B 7/185
[52] U.S. Cl. ...................... 342/357; 342/352; 342/463; 364/449.1
[58] Field of Search ...................... 342/352, 357, 342/417, 444, 449, 450, 451, 453, 463; 364/449.7, 449.8, 449.9

[56] References Cited

U.S. PATENT DOCUMENTS

| | | | |
|---|---|---|---|
| 4,646,096 | 2/1987 | Brown | 342/357 |
| 4,680,715 | 7/1987 | Pawelek | 364/449 |
| 4,728,959 | 3/1988 | Maloney et al. | 342/457 |
| 4,809,005 | 2/1989 | Counselman, III | 342/352 |
| 4,862,178 | 8/1989 | Sturza et al. | 347/357 |
| 4,894,662 | 1/1990 | Counselman, III | 342/357 |
| 4,912,475 | 3/1990 | Counselman, III | 342/352 |
| 4,954,837 | 9/1990 | Baird et al. | 342/458 |
| 4,963,889 | 10/1990 | Hatch | 342/357 |
| 5,014,066 | 5/1991 | Counselman, III | 342/352 |
| 5,019,824 | 5/1991 | Kumar | 342/195 |
| 5,036,330 | 7/1991 | Imae et al. | 342/357 |
| 5,072,227 | 12/1991 | Hatch | 342/357 |
| 5,075,693 | 12/1991 | McMillan et al. | 342/457 |
| 5,134,407 | 7/1992 | Lorenz et al. | 342/352 |
| 5,148,179 | 9/1992 | Allison | 342/357 |
| 5,177,489 | 1/1993 | Hatch | 342/357 |
| 5,185,610 | 2/1993 | Ward et al. | 342/357 |
| 5,202,829 | 4/1993 | Geier | 364/449 |
| 5,225,842 | 7/1993 | Brown et al. | 342/357 |
| 5,252,982 | 10/1993 | Frei | 342/357 |

OTHER PUBLICATIONS

J. H. Du Hart, III, et al., "An Integrated GPS/Strapdown Inertial Navigator Postmission Processor and Initial Test Results", pp. 188–196. (No Date).

Dr. Benjamin W. Remondi, "Kinematic and Pseudo–Kinematic GPS", The Institute of Navigation—Proceedings of the Satellite Division's International Technical Meeting, pp. 115–121. (No Date).

B. Hofman–Wellenhof, et al., "Global Positioning System – Theory and Practice", Springer—Verlag Wien New York, pp. 159–227, 1992. (No Month).

*Primary Examiner*—William L. Oen
*Attorney, Agent, or Firm*—Calfee, Halter & Griswold LLP; Sean T. Moorhead, Esq.

[57] ABSTRACT

A GPS system and method for real-time determination of integer ambiguities in a global positioning system (GPS) receiver and, more specifically, to a GPS system and method for determining integer ambiguities of a GPS solution using a Kalman filter with double difference integer ambiguities as additional states to estimate the ambiguities until they are estimated to within a sufficiently tight variance around their error estimates. Thereafter, all the candidate integer ambiguity values are searched in the range domain, e.g., along the double difference lines-of-sight for each satellite, until one is selected; if the after-the-fit residuals for the selected integers are below a certain threshold, then the selected integers are accepted as the integer ambiguities. If not, another set of candidate integer values are selected and analyzed.

23 Claims, 24 Drawing Sheets

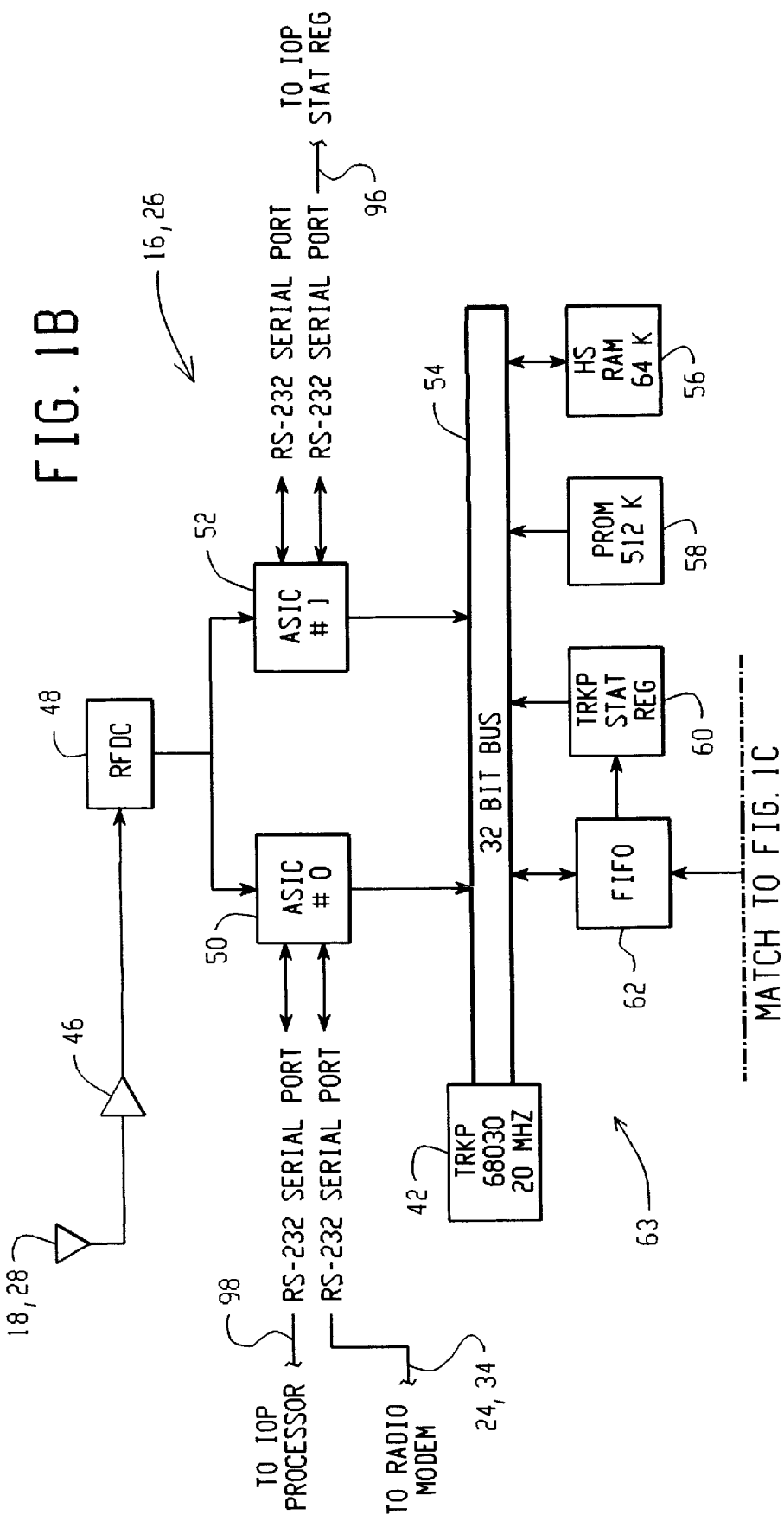

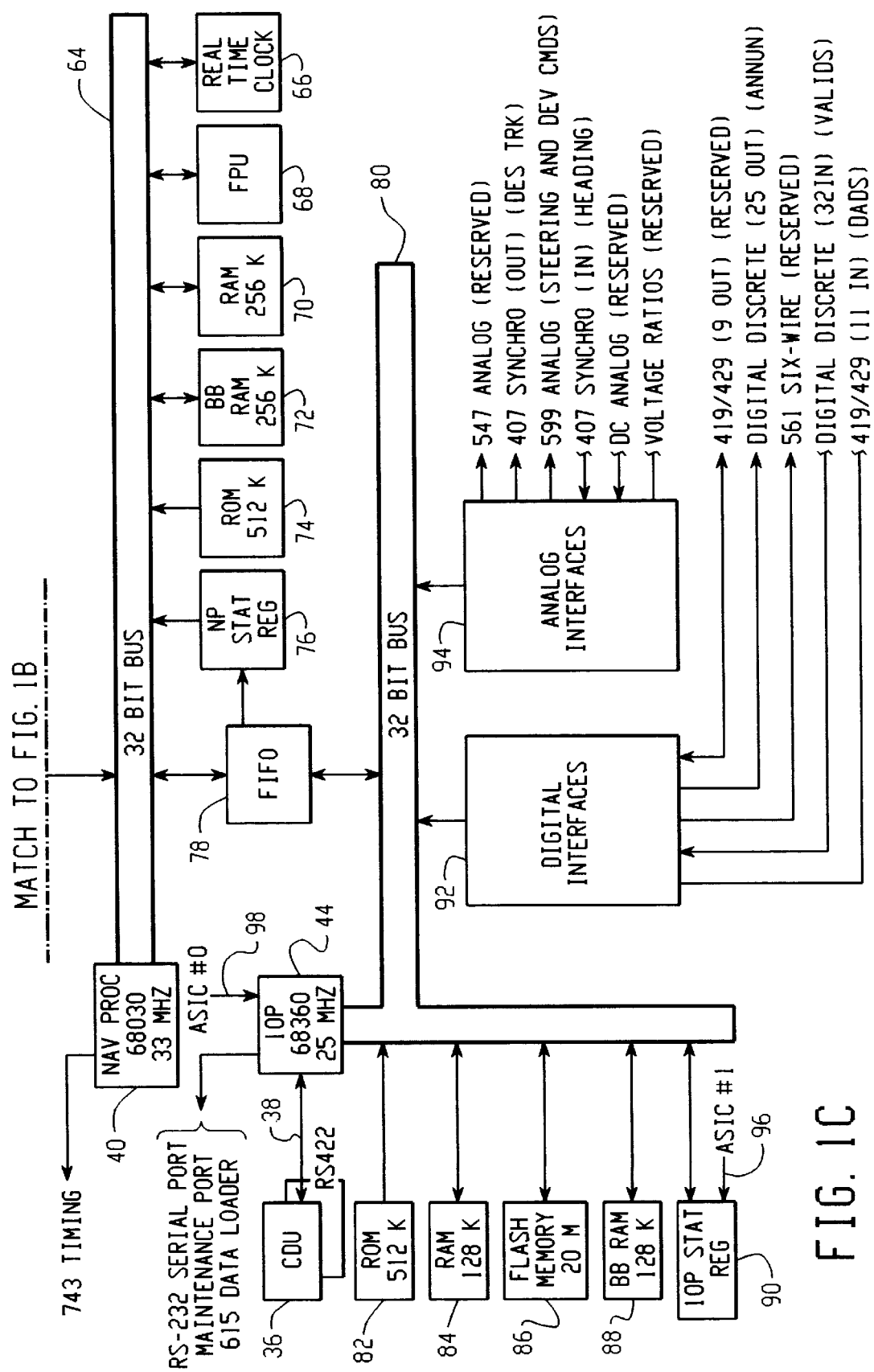

MATCH TO FIG. 9B

REAL-TIME HIGH-ACCURACY DETERMINATION OF INTEGER AMBIGUITIES IN A KINEMATIC GPS RECEIVER

FIELD OF THE INVENTION

The present invention relates generally to a GPS system and method for real-time determination of integer ambiguities in a global positioning system (GPS) receiver and, more specifically, to a GPS system and method for determining integer ambiguities of a GPS solution using a Kalman filter with double difference ambiguities as additional states to estimate the ambiguities until they are estimated to within a sufficiently tight variance around their error estimates. Thereafter, all the candidate integer ambiguity values are searched in the range domain until one is selected; if the after-the-fit residuals for the selected integers are below a certain threshold, then the selected integers are accepted as the integer ambiguities. An integer ambiguity is a measurement of a physical distance relationship between a satellite and a satellite receiver at a point in time. Thus, the present invention relates to the manipulation of data representing and relating to this physical distance relationship.

BACKGROUND OF THE INVENTION

Radio navigation systems are used for providing useful geographic location information to those with suitable receivers. One such system is the Global Positioning System (GPS). The GPS comprises a number of satellites, which are constantly orbiting the globe and are maintained by the government of the United States of America. GPS satellites transmit a complex signal to receivers. As is known to those skilled in the art, the GPS signal has an L1 and an L2 component, which are transmitted at 1575.42 MHz and 1227.6 MHz, respectively.

A user with a suitable GPS receiver can derive precise positional information, including position in three-dimensional space, velocity, and time of day from any place on the Earth, at any time of day, and in any weather. GPS receivers determine the above information to a very high degree of accuracy from the radio frequency (RF) GPS electromagnetic signals broadcast by the GPS satellites. As is known to those skilled in the art, the L1 and an L2 components are modulated with two pseudorandom codes: the L1 signal is modulated with both a precision code (P code) and a coarse acquisition code (C/A code) and the L2 signal is modulated with the P code alone. The P code is transmitted at 10.23 MHz and the C/A code is transmitted at 1.023 MHz.

To determine position in three-dimensional space, a receiver must receive GPS signals from at least three satellites. The more satellite signals the receiver receives, the more accurately the receiver can determine position in three dimensions.

The GPS is a radio navigation system that uses passive triangulation. In the GPS, a number of satellites orbiting the earth in well-defined polar orbits continually broadcast signals indicating their precise orbital positions. Each satellite broadcasts the two modulated carrier signals, L1 and L2. The same two frequencies are transmitted from all of the satellites, but the pseudorandom digital codes that are used to modulate the L1 and L2 carriers are unique for each satellite. Each satellite signal is based on a precision internal clock, and all the clocks in the satellites are effectively synchronized to each other by periodic transmissions from ground-based stations that are a necessary part of the GPS.

The receivers detect superimposed modulated L1 and L2 signals and measure either or both of the pseudorandom code and carrier phase of each detected signal, relative to their own internal clocks. Even though a receiver clock is not synchronized with the satellite clocks, a receiver can nevertheless determine the "pseudorange" to each satellite by performing a correlation of the received pseudorandom code and a pseudorandom code generated internally, based on the relative time of arrival of the received signals. While the satellite transmits its bit stream, the receiver simultaneously generates a duplicate series of ones and zeros (called a "generated code" or "replica code"). The receiver then receives the bit string from the satellite, which in theory varies from the generated code only in that it is time-shifted. The receiver then compares the received bit string with the generated bit string to compute the time-shift and therefore the travel time of the signal from the satellite to the receiver. Determining the travel time by comparing the relative shift between the two bit streams is called "autocorrelation." The travel time value is then multiplied by the speed of light to obtain the distance to the satellite.

Receivers determine position in space by determining the distance to each satellite at a given point in time. Knowing where the satellites are and knowing the distance to each satellite allows the receiver to calculate the receiver's location by solving very straightforward triangulation equations; the receiver position can then be mathematically determined from the pseudoranges and the known positions of the satellites. The clock error between the receiver's time reference and the satellite clocks can be eliminated by the availability of signals from an additional satellite. Thus, to solve for three unknown positional coordinates and the clock error requires the acquisition of four satellite signals.

To achieve very accurate results, the receivers must receive essentially error-free signals from the satellites. However, the signals from the satellites are rarely error-free. For example, typically, at least one of the satellites having a signal being received by the receiver is near the horizon. Therefore, the signal from that satellite is distorted and refracted by the atmosphere. The bending by the atmosphere causes an erroneous position to be calculated by the receiver.

This type of error is a common mode error; for all practical purposes, the error is common to all receivers in the same area. As such, common mode errors can be reduced by adding to the system a fixed reference receiver on the ground, the position of which has been very accurately measured. The reference receiver receives the signals from the satellites, broadcasts the determined errors to any participant receivers (e.g., roving receivers such as trucks, airplanes, ships, etc.) in the area, and may also broadcast its own location. The roving receivers use the determined errors of the reference site to correct any common mode errors in the satellite signals. The GPS system with the added reference sites is referred to as differential GPS (DGPS).

GPS satellites provide two types of signals that can be used for positioning. The superimposed pseudorandom digital codes provide unambiguous range measurements to each satellite. Using the correlation technique mentioned above, the pseudorange from the satellite to the receiver can be determined. However, the P code pseudorange is encrypted and, therefore, may not be used by civilians. Additionally, the C/A code pseudorange is purposefully corrupted so that a range more accurate than about 100 meters cannot be determined. Moreover, the C/A and P codes have a relatively long "wavelength," of about 300 meters and 30 meters, respectively and, consequently, use of the C/A code and the P code yield position data only at a relatively coarse level of resolution.

In addition to the pseudoranges superimposed onto the GPS signals, another type of signal that can be used for position determination is the carrier signals themselves. The L1 and L2 carrier signals have wavelengths of about 19 and 24 centimeters, respectively. Kinematic techniques are known techniques that use the carrier phase as a fine range measurement, as compared to other techniques that use a delta range, which is essentially a velocity observation. That is, the phase of one of the carrier signals is detected and tracked very accurately, permitting range measurements to an accuracy of less than a centimeter.

The principal difficulty with using carrier signals for range measurement is that, although the fractional portion of the number of cycles between the satellite and the receiver and the total number of integer wavelengths since the signal was locked onto can be determined very accurately by the system tracker, the integer number of wavelengths between the satellite and the initial position of the receiver cannot be determined solely from the received signal. This unknown number of whole wavelengths is referred to as the "integer ambiguity."

For example, assume that a particular satellite is exactly $10^8$ plus one-quarter L1 cycles from a receiver when the receiver first locks onto the satellite. The receiver can determine that at $t_0$, the receiver was at exactly one-quarter wavelength, plus some unknown integer value, from the satellite. As the distance between the receiver and the satellite changes, assuming the tracker maintains lock on the satellite, the tracker in the receiver can accurately determine the change in distance between the receiver and satellite. However, the receiver cannot determine the original $10^8$ value solely from the L1 signal. This inherent integer ambiguity arises because each cycle of the carrier signal looks exactly alike; therefore, the range measurement has an ambiguity equivalent to an integral number of carrier signal wavelengths. Various techniques are used to resolve the ambiguity.

It is known in the prior art to use a Kalman filter as a conventional GPS filter to estimate position and clock errors. It is also known in the art to use a Kalman filter in an inertially aided system using as additional states the error states for the inertial navigation system as well as velocity states. Other Kinematic GPS systems construct a large "cube" and evaluate the residuals between the measured carrier phase data and the expected carrier phase data at each point in the "cube." This is an extremely time-consuming process and prevents the systems from providing accurate positioning until the completion of this process, which could take several minutes.

Thus, the present invention is concerned with a novel system and method for determining this integer ambiguity.

SUMMARY OF THE INVENTION

According to the present invention, a computer system for real-time determination of a kinematic GPS solution is provided that uses a Kalman filter to estimate integer ambiguities. The present invention uses a Kalman filter, but the values used therein allow for real-time calculations. For example, as described more fully herein, some values being estimated in the Kalman filter are dropped out after they have been determined.

The present invention also uses a novel RAIM-based check to determine which particular satellite, if any, has a measurement error.

Finally, the present invention also uses a novel ambiguity search in which values are searched only along the range domain, e.g., along the double difference lines of sight between the satellites and the receivers.

It is therefore an advantage of the present invention to provide a method for real-time high-accuracy determination of GPS position data, without delay due to carrier phase ambiguity processing.

It is a further advantage of this invention to provide a system using a Kalman filter to determine in real time position, velocity, and carrier phase ambiguities from GPS signals.

It is another advantage of the present invention to provide accurate positioning during the ambiguity estimation process.

It is still another advantage to provide a more computationally efficient method of conducting this ambiguity estimation.

It is still a further advantage of the present invention to provide a faster search for integer ambiguities in kinematic GPS processing.

It is yet a further advantage of the present that, unlike prior art implementations of kinematic GPS, a "key" or "base" satellite is not selected for double difference construction. Thus, losing lock any one particular satellite does not necessarily cause particular problems.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIGS. 1B and 1C are a block diagram of a GPS receiver processor unit (RPU) according to the present invention;

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1A:
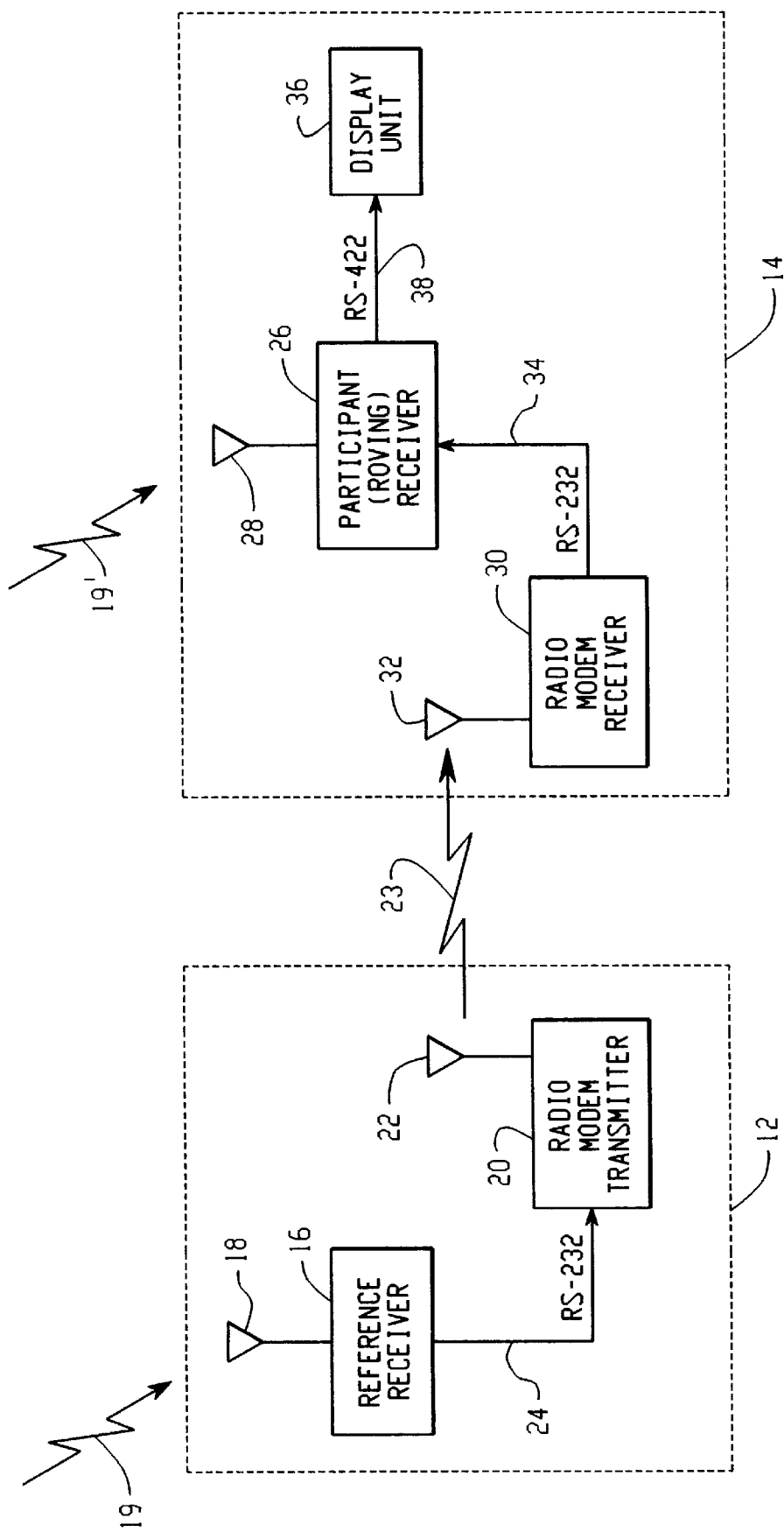
FIG. 1A is a block diagram of a GPS system of the present invention.

Referring now more particularly to the accompanying drawings, FIG. 1A shows a block diagram of the GPS system 10 of the present invention. The GPS system 10 of the present invention includes a reference subsystem 12 and a participant, e.g., roving, subsystem 14. The reference subsystem 12 includes a reference GPS receiver 16 having a reference GPS antenna 18. The reference subsystem 12 also includes some form of telemetry transmitter such as a radio modem transmitter 20 having a transmitter antenna 22. The reference GPS receiver 16 communicates with the radio modem transmitter 20 via a suitable reference communications link 24. While many digital or analog and serial or parallel protocols are suitable, the reference communications link 24 uses the RS-232 digital serial protocol.

One suitable commercially available GPS receiver is the IEC Model 9002 FMS Receiver Processor Unit (RPU), which is available from Interstate Electronics Corp., 1001 East Ball Road, Anaheim, Calif. 92803-3117, the assignee of the present invention, as part number 7596300. The IEC Model 9002 FMS RPU can be used as the reference GPS receiver 16. The reference GPS antenna 18 can be any suitable GPS antenna, such as part number CI-401-1, which is available from Comant Industries, 12920 Park Street, Santa Fe Springs, Calif. 90670. The radio modem transmitter 20 can be any suitable telemetry transmitter, such as part number RFA965, which is available from Pacific Crest, 1190 Miraloma Way, Suite W, Sunnyvale, Calif. 94086-4607, respectively.

The participant subsystem 14 includes a participant GPS receiver 26 having a participant GPS antenna 28. The participant subsystem 14 also includes some form of telemetry receiver such as a radio modem receiver 30 having a receiver antenna 32. The participant GPS receiver 26 communicates with the radio modem transmitter 30 via a suitable participant communications link 34. While many digital or analog and serial or parallel protocols are suitable, the participant communications link 34 uses the RS-232 digital serial protocol. A display unit 36 is in circuit communication with the participant GPS receiver 26 via a display communications link 38. While many digital or analog and serial or parallel protocols are suitable, the display communications link 38 uses the RS-422 digital protocol.

The IEC Model 9002 FMS RPU, the Comant CI-401-1, and the Pacific Crest RFA965, which were discussed above in connection with the reference subsystem 12, can be used as the participant GPS receiver 26, the participant GPS antenna 28, and the radio modem receiver 30, respectively.

The reference subsystem 12, also called a reference receiver 12, is set up to receive GPS signals 19 from a number of satellites and then determine CA code and carrier phase for each satellite. The CA code and carrier phase for each satellite are then transmitted to the participant subsystem 14 via a telemetry signal 23 between the modem transmitter 20 and the modem receiver 30. The reference receiver 12 also transmits its location to the participant subsystem 14. The actual frequency and modulation of the transmitted signals are not critical, what is important is that the CA code, carrier phase, and reference receiver location data are transmitted from the reference subsystem 12 to the participant subsystem 14.

Referring now to FIGS. 1B and 1C, a block diagram of a receiver processor unit (RPU) is shown. Either or both of the reference receiver 16 and the participant receiver 26 can be an RPU as shown in FIGS. 1B and 1C. The RPU contains a navigation processor 40, a tracking processor 42, and an I/O processor 44. As shown in FIG. 1A, the RPU has an antenna associated therewith. The output of this antenna 18, 28 is fed through an analog front end 46 to a RF downconverter 48. The downconverted L-band signal from the RF downconverter 48 is fed into two ASICs: ASIC#0 50 and ASIC#1 52. The actual tracking of the satellites is done in these two ASICs, which comprise elaborate shift registers and integrators, under the control of the tracking processor 42. For convenience a term "tracker 63" will be used synonymously with the ASICs 50, 52 and the tracking processor 42 and its associated memories and registers.

The ASICs 50, 52 are in circuit communication with the tracking processor 42 via a 32-bit tracking processor bus 54. Also connected to the tracking processor 42 through the tracking processor bus 54 are: 64 kilobytes of tracking high-speed RAM 56, 512 kilobytes of tracking PROM 58, tracking status registers 60, and a tracking-navigation FIFO 62. The tracking-navigation FIFO memory 62 is in circuit communication with the navigation processor 40 via a 32-bit navigation processor bus 64. Also in circuit communication with the navigation processor 40 via the navigation processor bus 64 are: a real time clock 66, a floating point coprocessor 68, 256 kilobytes of navigation RAM 70, 256 kilobytes of navigation battery-backed RAM 72, 512 kilobytes of navigation ROM 74, the navigation status registers 76, and a navigation-I/O FIFO memory 78. The navigation- I/O FIFO memory 78 is in circuit communication with the I/O processor 44 via a 32 bit I/O processor bus 80. Also in circuit communication with the I/O processor 44 via the I/O processor bus 80 are: 512 kilobytes of I/O ROM 82, 128 kilobytes of I/O RAM 84, 20 megabytes of I/O flash memory 86, 128 kilobytes of I/O battery-backed RAM 88, the I/O status registers 90, digital interfaces 92, and analog interfaces 94.

As shown in FIGS. 1B and 1C, the digital interfaces 92 have the capacity for ARINC 419/429 inputs and outputs and ARINC 561 inputs and outputs, in addition to discrete digital inputs and outputs. As shown therein, the analog interface 94 has a number of analog inputs and outputs.

The ASICs 50, 52 do the correlation of the GPS signal data. From the correlated GPS data, the tracking processor 42 determines code phase and carrier phase, which is then passed to the navigation processor 40 via the tracking-navigation FIFO 62. From the code phase and the carrier phase, the navigation processor determines the pseudorange and carrier phase.

The battery-backed RAMs 72 and 88 are used to store the almanac, the previous states, and are also used to back up the state of the GPS clock. The flash memory 86 is used for storing a database of course path points and can also be used to record flight data. Through the FIFOs 62, 78 the processors pass messages to one another. For example, the navigation processor 40 will pass deviation data to the I/O processor 44 through the navigation I/O FIFO 78. Each ASIC 50, 52 tracks 6 satellites each without multiplexing. Tracking all the GPS satellites in view without multiplexing maximizes the signal to noise ratio and minimizes the loss of cycles.

ASIC#0 50 is connected to the radio modem 20, 30 via RS-232 line 24,34. ASIC#1 52 is connected to the I/O status registers 90 via RS-232 line 98. ASIC#0 50 is connected to the I/O processor 44 via RS-232 line 98.

The exemplary hardware described herein will provide a suitable structure for the remainder of the present invention; however, other hardware platforms might also be suitable. What is important is that the system of the present invention receive computer-readable, time-correlated signals corresponding to the CA code and carrier phase for a number of satellites from both the reference antenna 18 and the participant antenna 28. For example, many of the benefits of the present invention can be realized by execution of the routines of FIGS. 2–18 on a general purpose computer using prerecorded and digitized GPS data (e.g., time-correlated CA code and carrier phase) and reference site location stored in an appropriate medium, such as a flexible diskette, hard diskette, CD-ROM, or the like. As known to those skilled in the art, such a general purpose computer system would have typically have a processing unit in circuit communication with RAM, ROM, a keyboard, a floating point coprocessor, a pointing device such as a mouse, a display adapter that generates a signal corresponding to a visual image for display on a video display monitor, and one or mode data storage drives such as a flexible diskette drive, a hard diskette drive, a CD-ROM drive, or the like, (all not shown in the context of a general purpose computer system). As such, the present invention can be embodied in a computer-readable computer program product comprising a computer readable medium having computer program logic recorded thereon (also known as a computer-readable medium of instructions), such as a flexible diskette, hard diskette, CD-ROM, or the like, having the routines described herein stored thereon.

Figure 2:
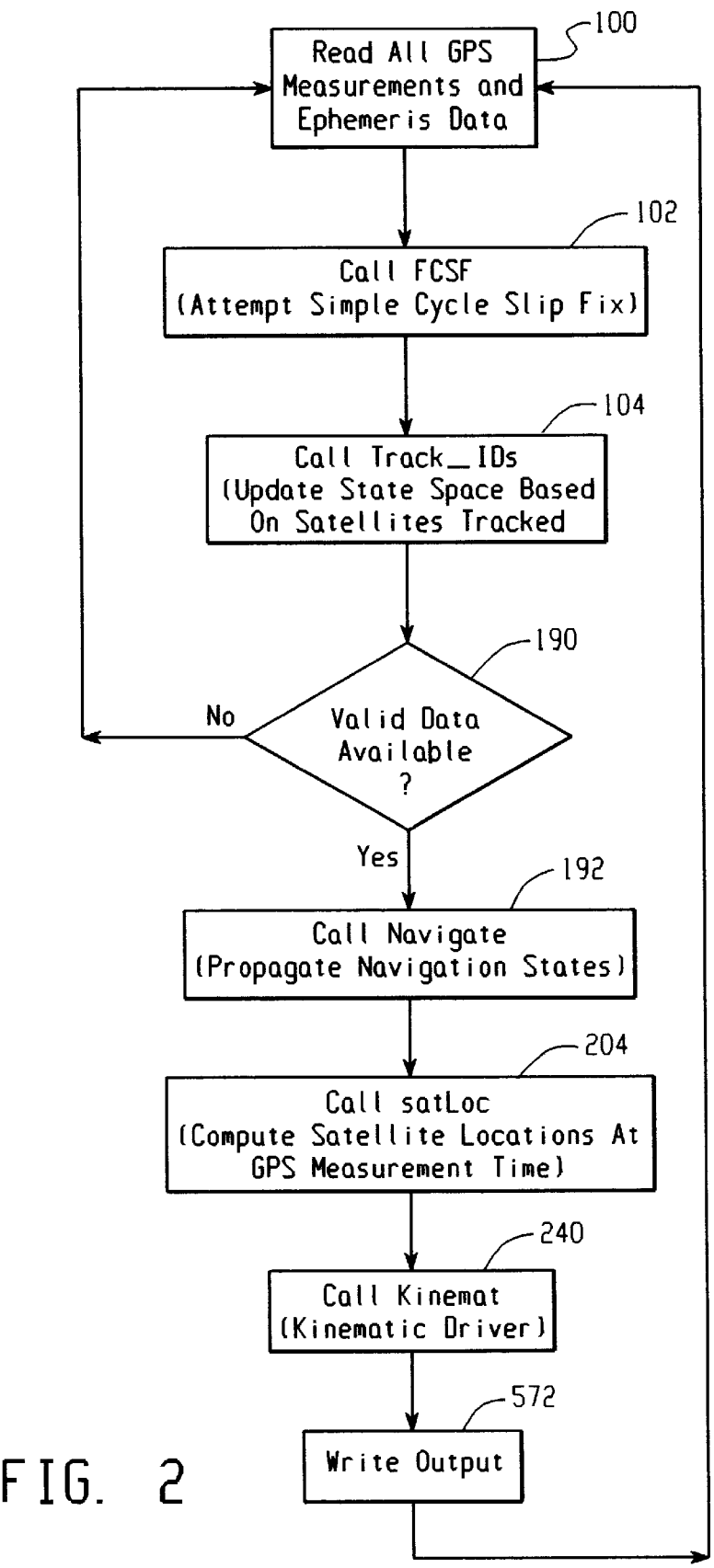
FIG. 2 is a flowchart showing an overview of the supervisory routine of the GPS system of the present invention.

Referring now to FIG. 2, an overview of the supervisory routine of the present invention is shown. This routine begins at task 100, where data values are read from the tracking-navigation FIFO 62 by the navigation processor 40. The navigation processor 40 reads ephemeris data, carrier phase, and pseudorange for each satellite that the ASICs 50, 52 of the participant receiver 26 are locked onto. Additionally, the navigation processor reads from the FIFO 62 reference telemetry receiver time-stamped CA code and carrier phase values for each satellite that the ASICs 50,52 of the reference receiver 16 are locked onto. At task 100 these values are merely read from the FIFO 62 and written to data structures used by the routines described below. For example, here the tracking processor 42 might indicate that the ASICs 50,52 have locked onto five satellites and have received ephemeris, pseudorange, and carrier phase values for each. Likewise, the reference telemetry receiver 30 might indicate that it has received the same information from four satellites locked onto by the ASICs 50, 52 of the reference receiver 16. This data collection can be either interrupt-driven from one or both receivers or polled, or some combination of interrupts and polling. Preferably, it is polled by the navigation processor 40 every one second. In the alternative, this data could have been collected and stored in a suitable storage medium such as a flexible diskette or magnetic tape, or the like. In this case, the values are read from the particular medium.

Figure 3:
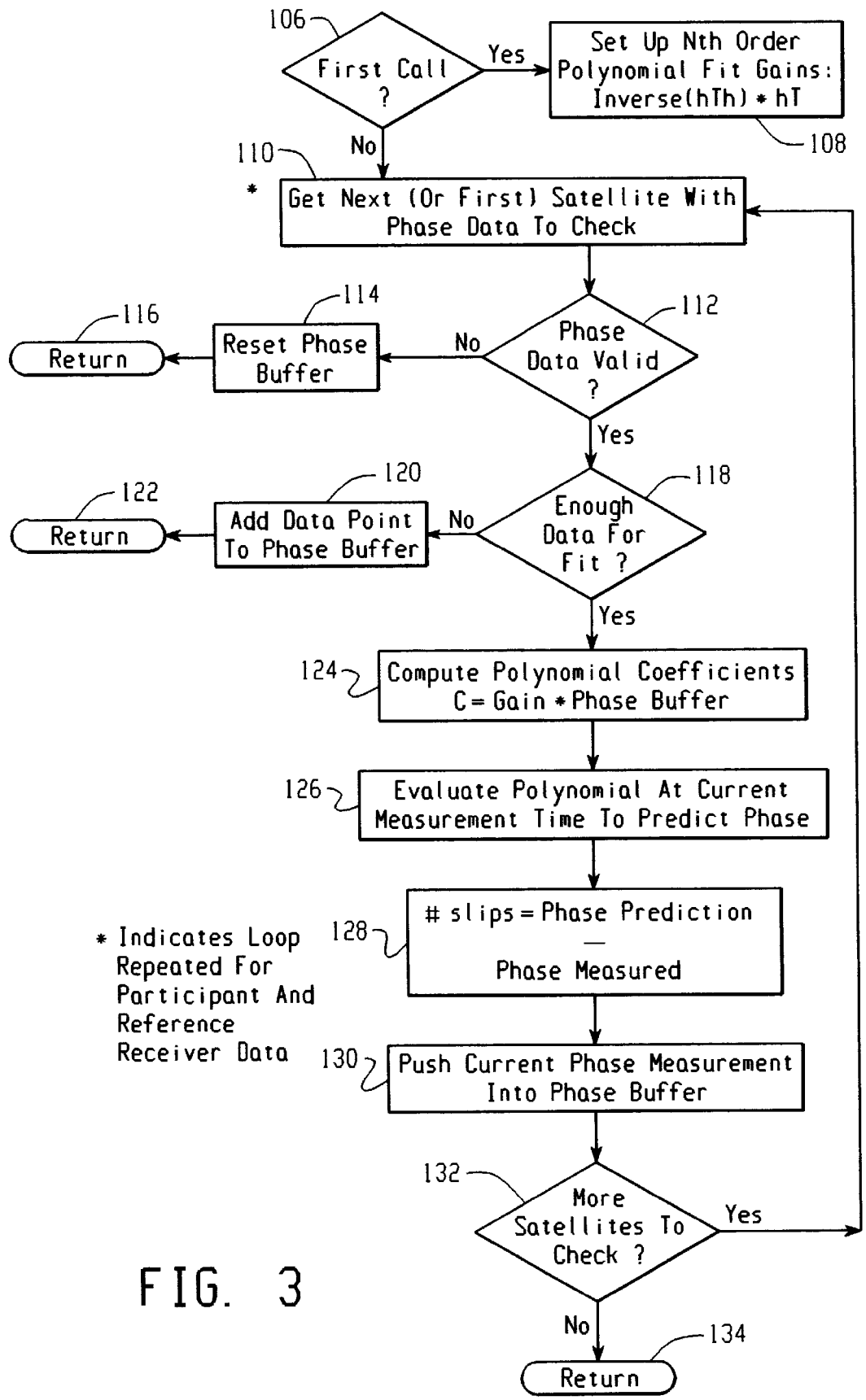
FIG. 3 is a flowchart showing the portion of the present invention that determines whether a cycle slip occurred.

Next, at task 102, the routine in FIG. 3 is called, which performs a first test to determine whether a cycle slip has occurred. In short, at task 102, the system analyzes the actual phase data for each satellite (double difference phases are calculated later) and fits a polynomial to the actual phase data, extrapolates the next actual phase measurement from the polynomial and then compares the extrapolated phase data point to the measured actual phase data point. If the difference between these values is not less than a predetermined threshold, then it is assumed that a cycle slip has occurred.

Referring now to FIG. 3, the cycle slip routine begins by testing at 106 whether an initialization is appropriate, as would be when power to the system 10 is first applied or when the system performs a soft reset, as further explained below. If an initialization is appropriate, the routine sets up Nth order polynomial fit gains at task 108 by calculating:

$$[G] = ([H]^T[H])^{-1} * [H]^T$$

where $$H = \begin{bmatrix} 1 & \Delta t_x & \Delta t_x^2 & \Delta t_x^3 \\ 1 & \Delta t_x & \Delta t_x^2 & \Delta t_x^3 \\ & & \cdot & \\ & & \cdot & \\ & & \cdot & \\ & & N \text{ rows,} & \end{bmatrix}$$

where $[H]^T$ indicates the transpose of the matrix $[H]$, and where N is the number of satellites, the GPS signals of which both the participant receiver 26 and the reference receiver 16 are currently locked onto.

The gains computed this way are only a function of $\Delta t$, the time interval between data measurements, which is a known parameter. Consequently, the gains can be precomputed, thereby avoiding the requirement of performing the computationally expensive inversion of the N by N matrix.

Next, starting at task 110, the first or next satellite is analyzed for a cycle slip. The tasks indicated by 112–132 are performed on each phase measurement for each satellite for both the reference receiver 16 and the participant receiver 26 before any double differencing is done. The flow of code execution then branches, at 112, depending on whether the participant receiver 26 indicates that it has phase-lock on at least one satellite signal. If the participant receiver 26 is not locked onto at least one satellite GPS signal, then the buffer containing the collected phase data is reset, at 114, which discards the data. Thereafter, the execution control is returned to the calling program, at 116.

On the other hand, if the participant receiver 26 is locked onto at least one satellite GPS signal, then the data analysis continues at 118. The gross cycle slip detector routine of FIG. 3 requires a predetermined number of valid phase measurements. At 118, the routine tests whether enough data points have been collected for a given satellite. If not, the current data point is added to the phase buffer, at 120, and the program control is returned to the calling instruction, at 122.

The routine at 120 essentially loads up a buffer containing a predetermined number of phase measurements that are all valid:

$$\vec{\text{buffer}} = \begin{bmatrix} \Phi_1 \\ \Phi_2 \\ \cdot \\ \cdot \\ \cdot \\ \Phi_N \end{bmatrix}$$

where N is the number of satellites, the GPS signals of which both the participant receiver 26 and the reference receiver 16 are currently locked onto. Continuing from task 118, if enough data have been collected, then the polynomial coefficients can be calculated, at 124. The polynomial coefficients are calculated as follows:

$$\vec{C} = [G] * \vec{\text{buffer}}$$

The precomputed gain, which is an N by N matrix, is multiplied by the N by 1 vector representing the collected data points, which results in an N by 1 matrix (vector) representing the polynomial coefficients. The polynomial is then projected forward, at 126, to the current time, which effectively predicts the phase at the current time:

$$\Phi_{pred} = C_0 + C_1 \Delta t + C_2 \Delta t^2 + C_3 \Delta t^3 + \ldots$$

Next, at 128, the recently measured actual phase is used to calculate the number of slips by subtracting the new actual phase from the predicted phase:

$$N_{slips} = \Phi_{pred} - \Phi_{N+1}$$

which is then rounded to the nearest integer. If the difference between these values is not less than a predetermined threshold, e.g., 0.1 L1 wavelength, then it is assumed that a cycle slip has occurred and the calculated number of the slips is added to the measurement to adjust it.

Then, the new actual phase value is pushed onto the buffer, at 130. The buffer is a circular buffer, with the oldest value being discarded as a new value is added. The buffer can hold a predetermined number of phase measurements, preferably on the order of 5–7 values.

Here, the phase values, both measured and predicted, are the number of complete cycles of a carrier that have been since the system 10 started monitoring the carrier. The phase data is the number of cycles, the number of whole 360° of phase, that have been counted by the tracker 63 since it locked onto that particular satellite. These values start off effectively at zero and start counting up, even though there were initially possibly millions of cycles between each satellite (the integer ambiguity).

The routine of tasks 112–130 must be performed once for each satellite for the roving receiver, and once for each satellite for the reference receiver. Therefore, if any additional satellites have not had a cycle slip analysis, then program control jumps back to 110 to begin the cycle slip analysis for the next satellite.

If all the satellites have had a cycle slip analysis for both receivers' data, then program control returns to the calling program at FIG. 2.

Figure 4:
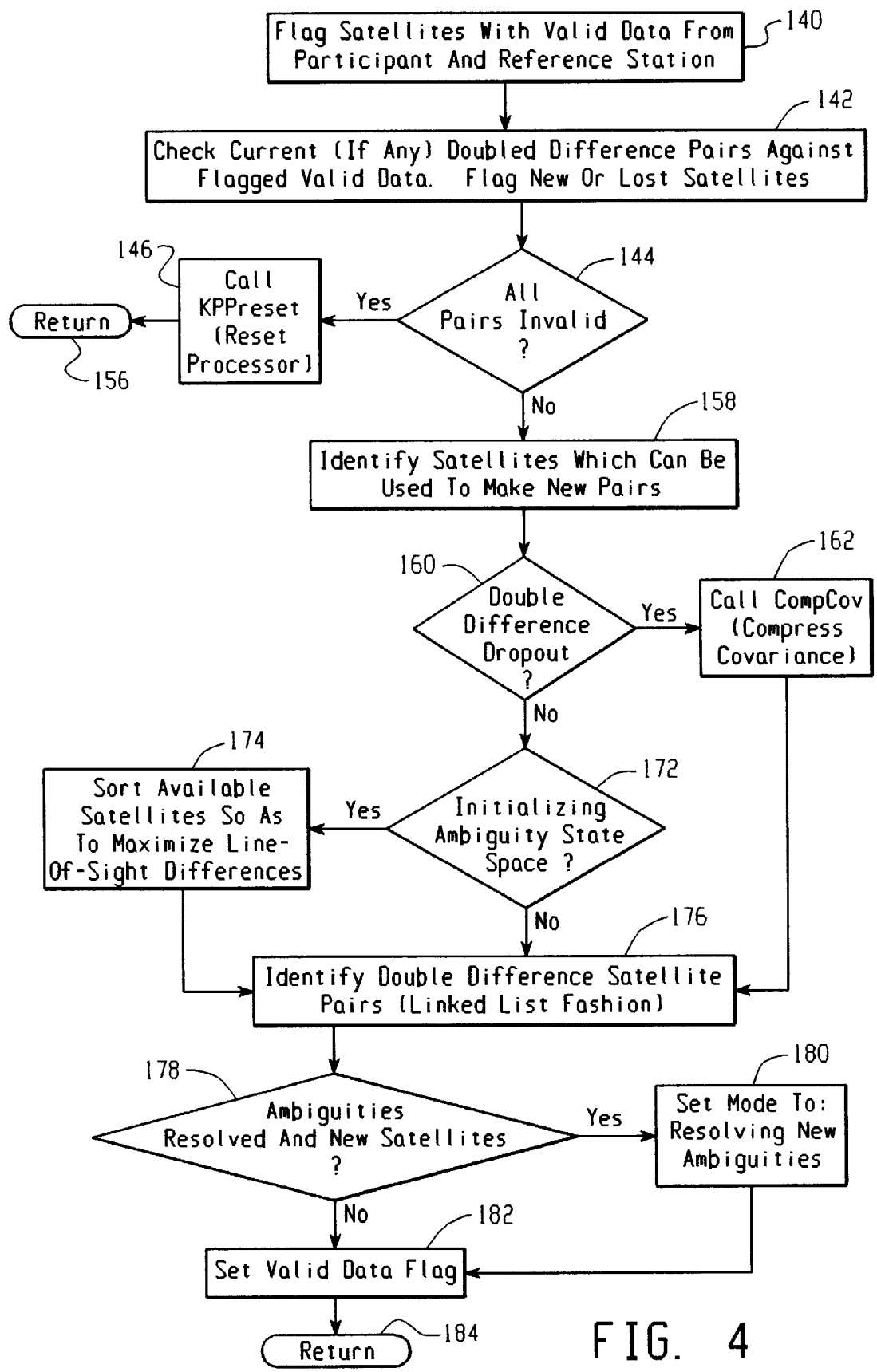
FIG. 4 is a flowchart showing the portion of the present invention that determines if the participant and reference receivers are tracking the same satellites.

Referring back to FIG. 2, next, at 104, the routine that updates the parameters is called. Referring now to FIG. 4, the routine that provides much of the book keeping between the two receivers is found. One problem with DGPS is that two receivers are independently tracking a number of satellites and there is no control between them. So the routine must determine if the two receivers are tracking the same satellites; they must determine whether they have lock on the same satellites.

Starting at 140, a table of solid satellite data from each receiver is created. For example, the reference receiver might have a lock on three satellites (e.g., 15, 21, and 33). The table for the reference receiver indicates these three satellites. There is a corresponding table for the roving receiver. Hopefully the tables are identical, that is, both the roving receiver and the reference receiver are receiving (are locked onto) the same satellites. Examples of matched double difference pairs are: (1,2), (2,3), and (3,20) for the roving receiver and (1,2), (2,3), and (3,20) for the reference receiver, where 1, 2, 3, and 20 are satellite PRNs of satellites locked onto by both the roving and the reference receiver. Unfortunately, one receiver might not be receiving all the satellites the other is receiving and might be receiving additional satellites. Task 140 builds up this information; the number and identity of the satellites locked onto by both satellites is used throughout the invention.

Then, at task 142, the system 10 checks the current double difference pairs against the flagged valid data. If a new satellite is locked onto or the tracker 63 loses lock on a particular satellite, then the system must adjust for this change. Consequently, new or lost satellites are flagged, at 142. For example, as one satellite drops beneath the horizon and lock is lost and other one rises above the horizon and lock begins, these satellites are flagged as being lost and new, respectively. The code actually only tracks ambiguity pairs, instead of satellites, but for ease of this discussion, they will be referred to as satellites from time to time. These values are placed in a table that indicates an ambiguity pair, e.g., ambiguity pair number 3, has just dropped out.

Next, at 144, the program execution depends on whether all the ambiguity pairs were flagged as invalid (no lock). If at least one double difference pair is able to be calculated for both the reference receiver and the roving receiver, then this test is false. All the pairs might be invalid if, for example, if the tracker 63 loses lock on all the satellites or the antenna is damaged. If none of the satellites are locked onto, then, at 146, a routine is called to perform a soft reset of the system, which causes the code to start over, as though the system 10 was just turned on. Thus, task 146 calls the code of FIG. 5.

Figure 5:
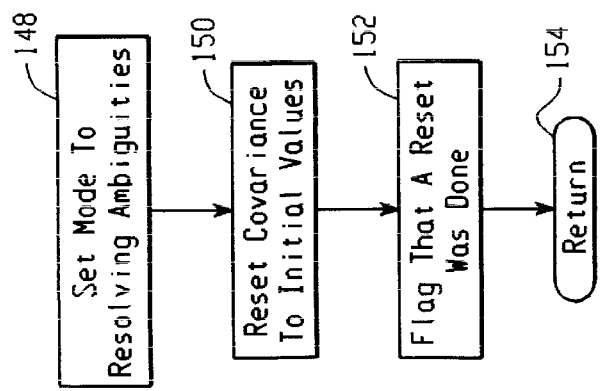
FIG. 5 is a flowchart showing the portion of the present invention that performs a soft reset of the system

Referring now to FIG. 5, the code that performs a soft reset of the system is shown. The reset essentially resets the data to make the system appear as though it was just turned on. As the system is reset, it is not known what state the system is in. Whatever caused the soft reset to be required might have occurred before the system resolved the integer ambiguities, or might have occurred after the integer ambiguities were resolved as the system was maintaining those ambiguities and tracking the satellites. Thus, first, at 148, the system is put into the mode that causes it to resolve the integer ambiguities. In addition to that mode, there is a mode that indicates that all the integer ambiguities have been resolved and there is a mode that indicates that all the ambiguities have been resolved, but a new satellite has been locked onto (a new double difference pair is available). These modes are identified by readable and writable flags or semaphores, in circuit communication with the CPU, as known to those skilled in the art.

After the mode is set, at 150, the covariance matrix is reset to its initial values, which essentially involves resetting the Kalman filter to its initial values. In the initial state the Kalman filter has zero in the off-diagonal locations and the initial a-priori error variances along the diagonal. Then, at 152, a flag is set that indicates that a reset was done, so that other routines of the present invention are aware that the data was just cleared. Finally, at 154, the code returns to the calling program.

Referring back to FIG. 4, the code returns at task 156, which merely causes program execution to return to the calling program.

At task 144, if at least one valid double difference pair remains, then the code continues at 158, where satellites that can be used to make new double difference pairs are identified. If a satellite is newly being received by both the roving receiver and the reference receiver, but is not currently being used in a double difference pair, then that satellite is flagged. Task 158 uses the data block built up at task 140 to determine if any satellites were lost or gained.

Figure 6:
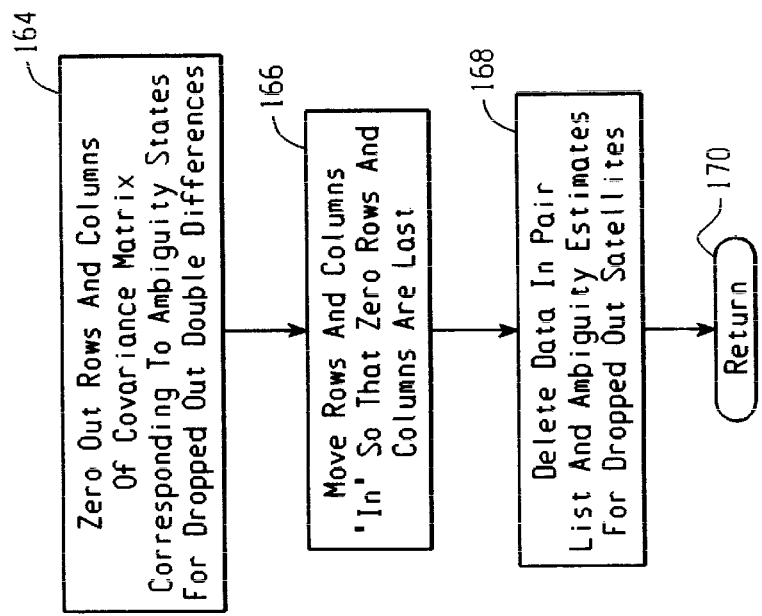
FIG. 6 is a flowchart showing the portion of the present invention that adjusts (e.g., compresses) the covariance matrix for any missing satellites.

Then at 160, the system determines whether there are any satellites that are no longer valid in double difference pairs that are currently being tracked. If so, then at 162, the routine of FIG. 6 is called to adjust (compress) the covariance matrix for the missing satellite. Referring now to FIG. 6, first the code zeros out the rows and columns of the covariance matrix corresponding to the ambiguity states for the dropped out double differences. So, at this stage, the covariance matrix does not change in size; only certain values are zeroed out. Then, at 166, the rows and columns are moved in the matrix so that the zero rows and columns are last. This step is important because the data is stored in UD factorized form. Next, the pair list is updated (pairs corresponding to dropped satellite are deleted) to reflect the satellite that dropped out and the ambiguity estimates for the satellite that dropped out are deleted, at 168. Finally, at 170, the code returns back to the calling program.

Referring back to FIG. 4, assuming that the test at 160 indicates that there were no double difference drop outs, at 172 if a new double difference ambiguity has been identified then a state must be initialized to accommodate it.

Then, at 172, the code branches depending on whether the ambiguity state space is to be initialized. This is performed only once with a given set of data. It is performed each time the system 10 is powered and after a soft reset, described above. If the ambiguity state space is to be initialized, then the available satellites are sorted to maximize the line-of-sight differences. Essentially, the satellites are sorted to maximize the angular difference between the pairs and is performed as follows:

$$\Delta\theta = \cos^{-1}(l_i * l_j)$$

where, $$\vec{l_i} = \left( \frac{\Delta X_i}{R}, \frac{\Delta Y_i}{R}, \frac{\Delta Z_i}{R} \right)$$

$\Delta X_i$=satellite $x$ coord.−receiver $x$ coord $\Delta Y_i$=satellite $y$ coord.−receiver $y$ coord $\Delta Z_i$=satellite $z$ coord.−receiver $z$ coord likewise for $j$ Essentially, there are ways to pair the available satellites to give better geometries. Maximizing the angle between the vectors between the receiver and the two satellites in the new pair makes the ambiguities more observable. It is an advantage of the present that, unlike prior art implementations of kinematic GPS, a "key" or "base" satellite is not selected for double difference construction.

After the available satellites are sorted to maximize the angular difference between pairs, or if the ambiguity state space was not to be initialized, as tested at 172, the double difference satellite pairs are identified in a linked list fashion, at 176. The routine at 176 takes the list of satellites and makes pairs out of them in a link list. A problem is that one wants each satellite in two double difference pairs at the most. When the tracker 63 locks onto a new satellite, it cannot be linked anywhere in the chain of double difference pairs. It must be linked into the list at the ends, which might lead to less than optimal geometry compared to the routine of task 174, which is only executed once.

For example, suppose satellites 1, 2, 3 and 4 are visible. A list of double difference pairs might be 1-2, 2-3, 3-4. When a new satellite is locked onto, it cannot be linked with 3 again, for example. If satellite 6 is the new satellite, it must be linked with either 1 or 4: e.g., 1-2, 2-3, 3-4, 4-6. If satellite 3 drops out, then two pairs are lost and the list becomes: 1-2, 2-4, 4-6.

Once the double difference satellite pairs are identified in linked list fashion at 176, the system 10 tests at 178 whether (i) all the integer ambiguities have been resolved and (ii) the tracker 63 has locked onto a new satellite. If so, at 180 the mode is changed to cause the system to resolve at least one new integer ambiguity. If not, the system sets the data valid flag, which indicates that some valid data is available and ready to be processed, at 182. Finally, at 184, the code returns.

Referring back to FIG. 2, the code next tests whether valid data is available, at 190, by testing the data valid flag, which is cleared as the system is reset and set at task 182 if at least one double difference pair is available. If not, then execution jumps back to task 100, where more data is collected. If valid data is available, then at 192, the system 10 next calls the routine of FIG. 7 that propagates the navigation states.

Figure 7:
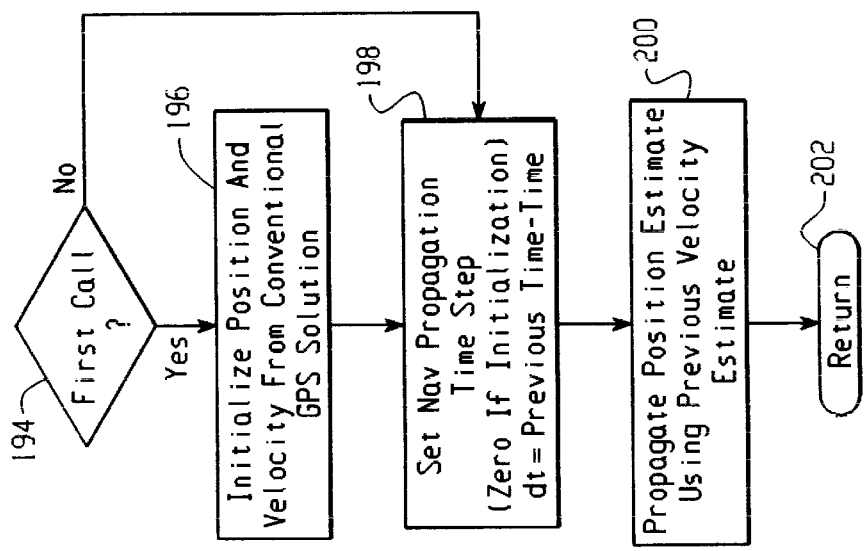
FIG. 7 is a flowchart showing the portion of the GPS system of the present invention that propagates the navigation states.

Referring now to FIG. 7, the routine that essentially predicts ahead of time what the aircraft or vehicle state is at the current measure of time is shown. First, at 194, this routine tests whether this is the first time it has been called. If so, then the position and velocity from a conventional GPS solution are initialized, at 196. The values could be set to zero, but the system is more efficient if the values are set to some gross initial position and velocity values, which are calculated under the assumption that a conventional GPS solution is available. The techniques for deriving a conventional GPS solution from data collected by a single GPS receiver are known to those of ordinary skill in the art. After the position and velocity values are estimated, the time step is initialized to zero.

After the values are initialized, or if they are not initialized as tested at 194, the propagation time step is calculated as dt=previous time−current time, at task 198. Then at 200, the position estimate is finally propagated using the previous velocity estimate as follows:

$$\vec{P}_t = \vec{P}_{t\ previous} + \vec{V}\Delta t$$

Finally, the code returns to the calling program, at 202.

Figure 8:
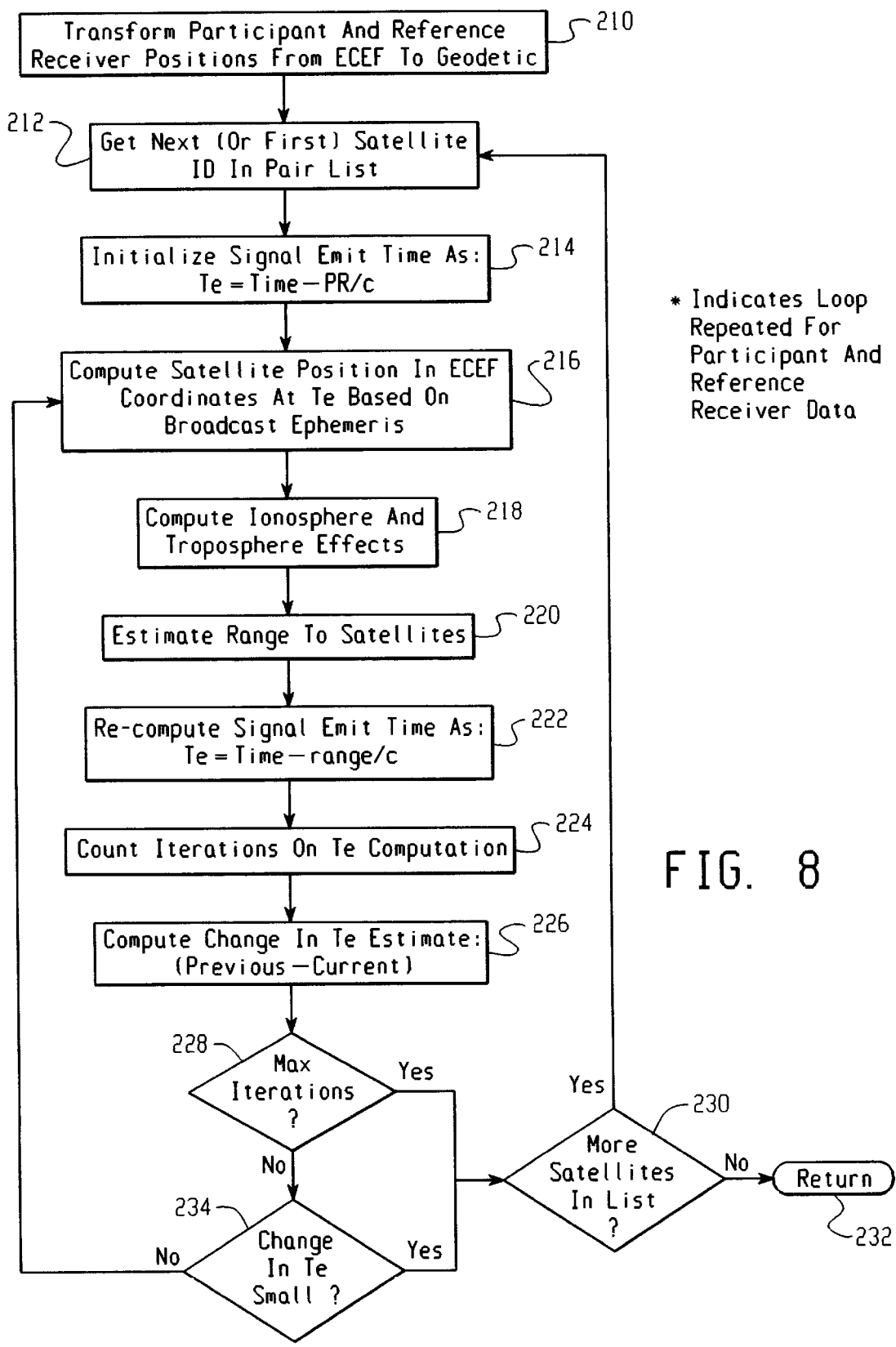
FIG. 8 is a flowchart showing the portion of the GPS system of the present invention that predicts where the satellites are located.

Referring back to FIG. 2, the main program next at 204 calls the routine of FIG. 8. In the code of FIG. 7 the system predicted where its own position is (the position of the roving receiver). The position of the reference receiver is already known (it is fixed). The code of FIG. 8 predicts where the satellites are located.

Referring now to FIG. 8, the routine starts at 210, where the positions of the roving and reference receivers are converted from earth centered earth fixed (ECEF) coordinates to geodetic coordinates, as known to those skilled in the art. Next at 212, the first or next satellite identified in a pair list is selected.

The routine indicated by tasks 214–226 is performed for each satellite identified in a pair list. The details of these routines are known to those skilled in the art and are found in public document GPS ICD-200, which is available from common sources. At 214, the signal emit time for the selected satellite is initialized to a particular estimated value calculated as follows:

$$Te = \text{current time} - PR/c$$

where,

PR is the pseudorange c is the speed of light

The routine from 216–226 is an iterative routine performed a number of times for each satellite. At 216 the system computes the satellite position in earth centered earth fixed coordinates at Te based on its broadcast ephemeris, as known to those skilled in the art. Then, at 218, the ionosphere and troposphere effects are calculated for the selected satellite using standard models for atmospheric delays, as known to those skilled in the art. Then the range to the satellite is estimated, at 220, as follows:

$$\text{estimated range} = ((x-x_{sv})^2 + (y-y_{sv})^2 + (z-z_{sv})^2)^{1/2}$$

Then the signal emit time is recomputed, at 222, as follows:

$$Te = \text{current time} - \text{estimated range}/c$$

Essentially, at task 222 the signal emit time that was calculated in task 215 is recomputed, and is presumably more accurate after each iteration. However, the estimate is the type of calculation that can oscillate between two values; therefore, the estimate is only performed a fixed number of times, e.g., ten times. Thus, at 224 the count of the times the routine has iterated is incremented and at 226 the difference between the previously estimated signal emit time and the currently estimated emit time is calculated by subtracting the current from the previous. At 228, the system determines if the maximum number of iterations, e.g., ten, has been reached. If so, then the system tests whether there are any more satellites in the list that need to have their positions estimated. If not, then program execution returns to the calling program, at 232. If satellites remain, then the code branches up to task 212 to begin the process of estimating the position for the next satellite.

Returning back to task 228, if the maximum number of iterations for the routine of tasks 216–226 has not been reached, then the change in signal emit time is tested to determine if it is below a threshold, e.g., 1 μs., at 234. If the change in signal emit time from the last iteration is below the threshold, then the test at 230 is performed, as discussed above. If the change in signal emit time is not below the threshold, then program execution branches back up to task 216 to perform another iteration of the routine of tasks 216–226 to further refine the signal emit time calculation.

Figure 9A:
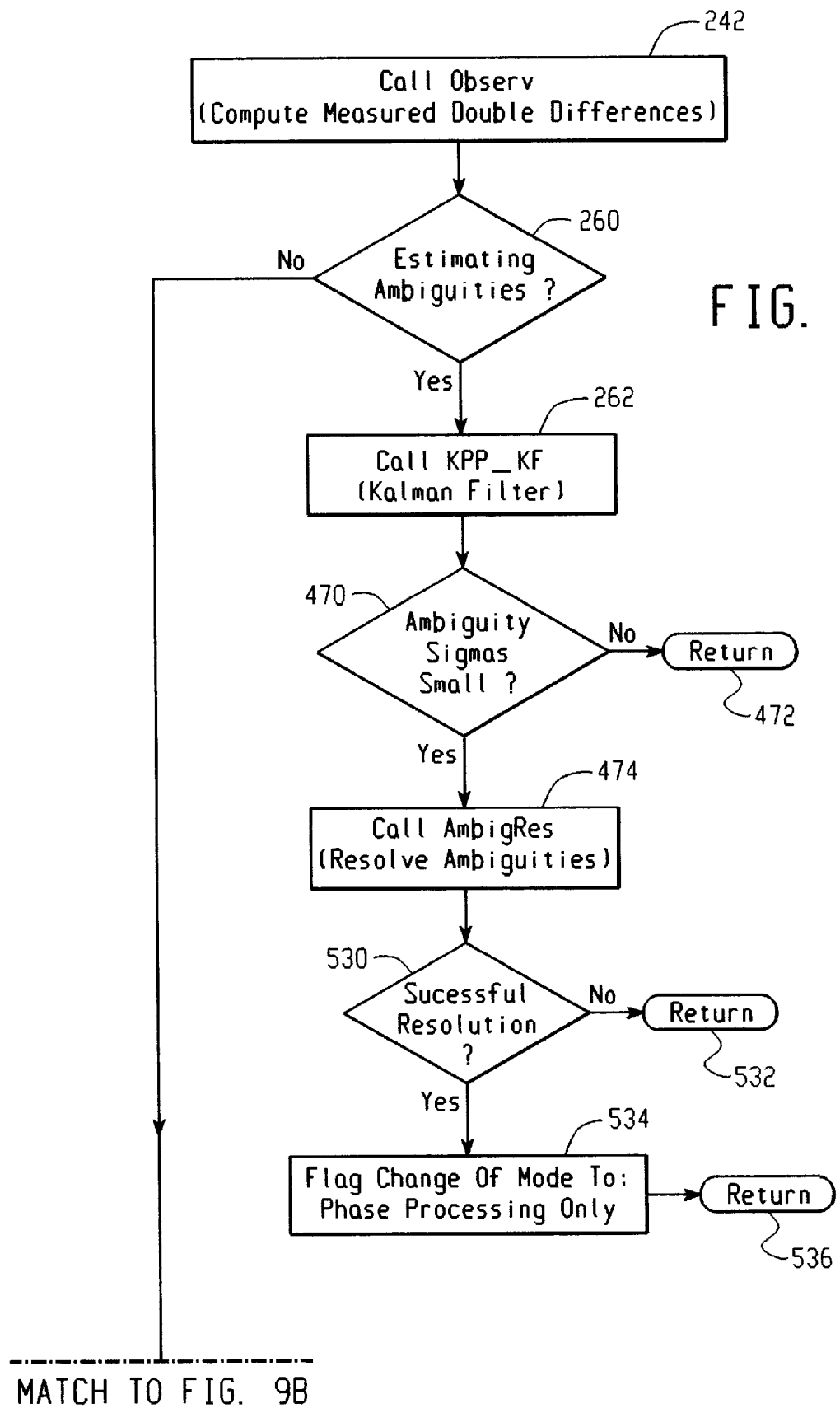
FIGS. 9A and 9B are a flowchart showing the supervisory portion of the kinematic routines of the GPS system of the present invention.
Figure 9B:
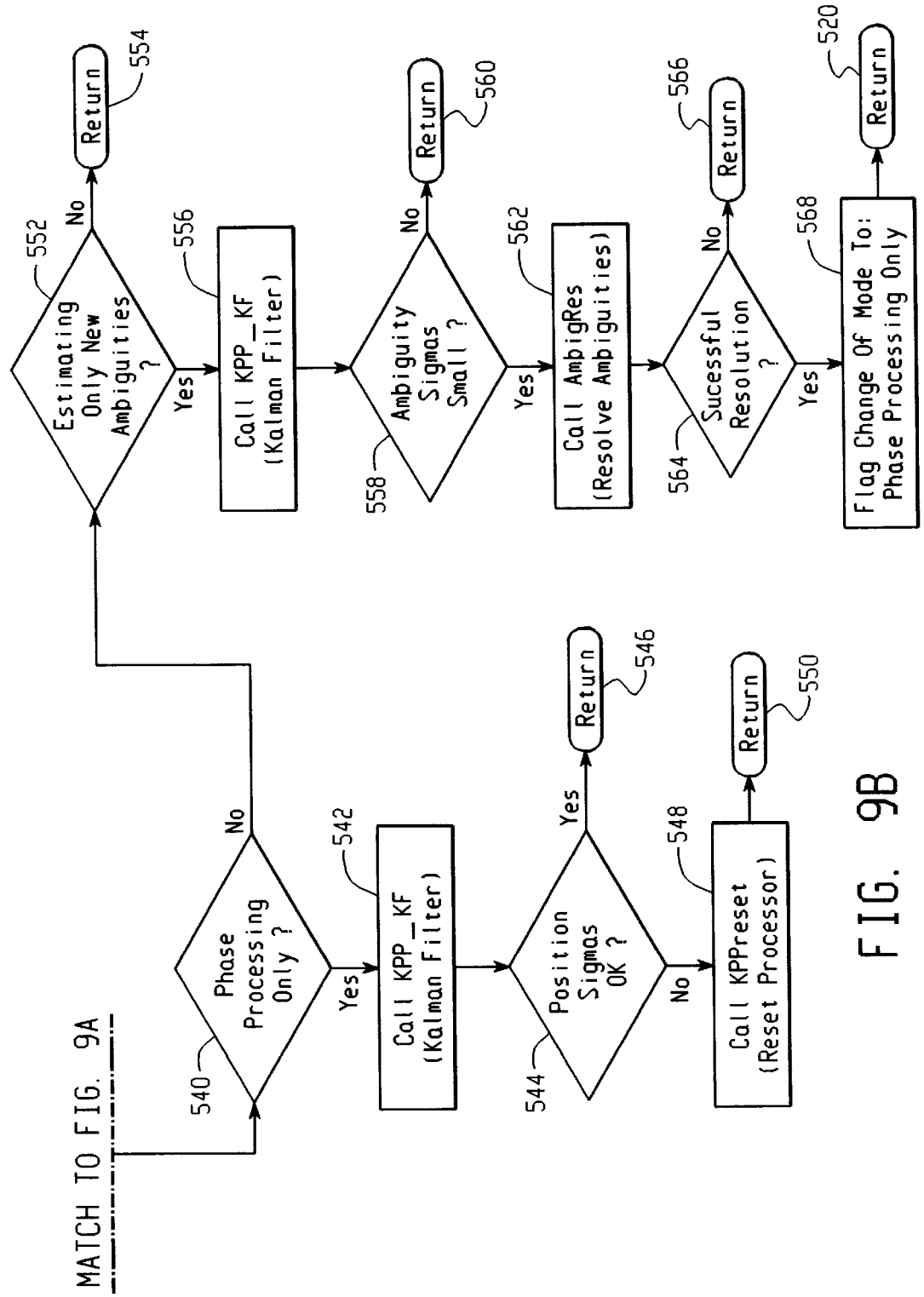
Figure 10:
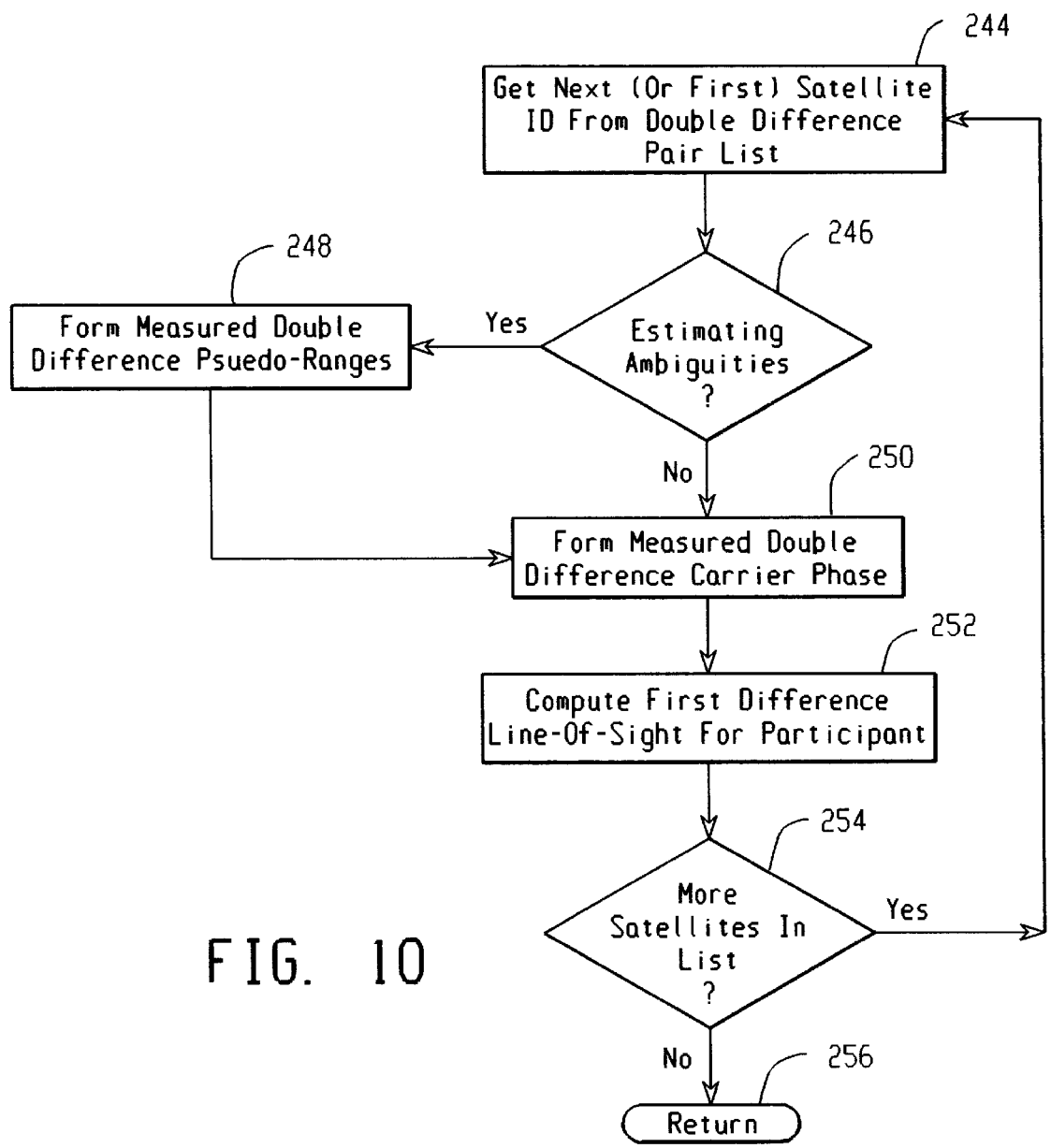
FIG. 10 is a flowchart showing the portion of the GPS system of the present invention that calculates the measured double differences.

Referring back to FIG. 2, the main program next, at 240, calls the routine of FIGS. 9A and 9B, which show the supervisory program for the kinematic routines. Referring now to FIGS. 9A and 9B, the routine begins at 242 by calling the routine of FIG. 10, which calculates the measured double differences. Referring now to FIG. 10, the routine starts at 244 where the next (or first) satellite identification from the double difference pair list. Previously, the satellites were paired only in a virtual or bookkeeping fashion; here the data is actually paired to form double differences. Then at 246 the routine of FIG. 10 checks to see which mode the system 10 is in. If the system is in the mode of estimating the ambiguities, then at 248 all the measured double difference pseudo-ranges are calculated for all the double difference pairs, determined above, as follows:

$$\nabla \Delta PR_{meas} = (PR^P_i - PR^P_j) - (PR^{RR}_i - PR^{RR}_j)$$

where:

PR are the pseudoranges received from each satellite i and j are satellites forming the double difference pair P is the roving (participant) receiver value and RR is the reference receiver value After the double difference pseudoranges are calculated, or if they are not to be calculated as determined at 246, the measured double difference carrier phases are calculated for all the double difference pairs, at 250, as follows:

$$\nabla \Delta \phi_{meas} = (\phi^P_i - \phi^P_j) - (\phi^{RR}_i - \phi^{RR}_j)$$

Where:

φ is the carrier phase as measured by the tracker 63 for each satellite and the other variables are the same as in the previous equation Then at 252, the first difference line-of-sight for the participant (roving receiver) is calculated for each satellite. The line-of-sight is essentially a vector from the participant to the satellite and the first difference line-of-sight is calculated as follows:

$$\vec{1}^P_{ij} = (\vec{1}^P_i - \vec{1}^P_j)$$

where:

$$\Delta \vec{1}^P_i = \frac{\Delta X^P_i}{R^P_i}, \frac{\Delta Y^P_i}{R^P_i}, \frac{\Delta Z^P_i}{R^P_i}$$

$\Delta X^P_i$ is the x-coordinate of range to the $i^{th}$ satellite from the participant receiver $\Delta Y^P_i$ is the y-coordinate of range to the $i^{th}$ satellite from the participant receiver $\Delta Z^P_i$ is the z-coordinate of range to the $i^{th}$ satellite from the participant receiver $R^P_i$ is the range to ith satellite from participant After the first difference line-of-sight for the current satellite is calculated, the system 10 determines at 254 if any other satellites remain to be processed by tasks 246–252. If so, then program execution branches to 244 to identify the next satellite to be processed. If not, then program control returns to the calling code, at 256.

Figure 11A:
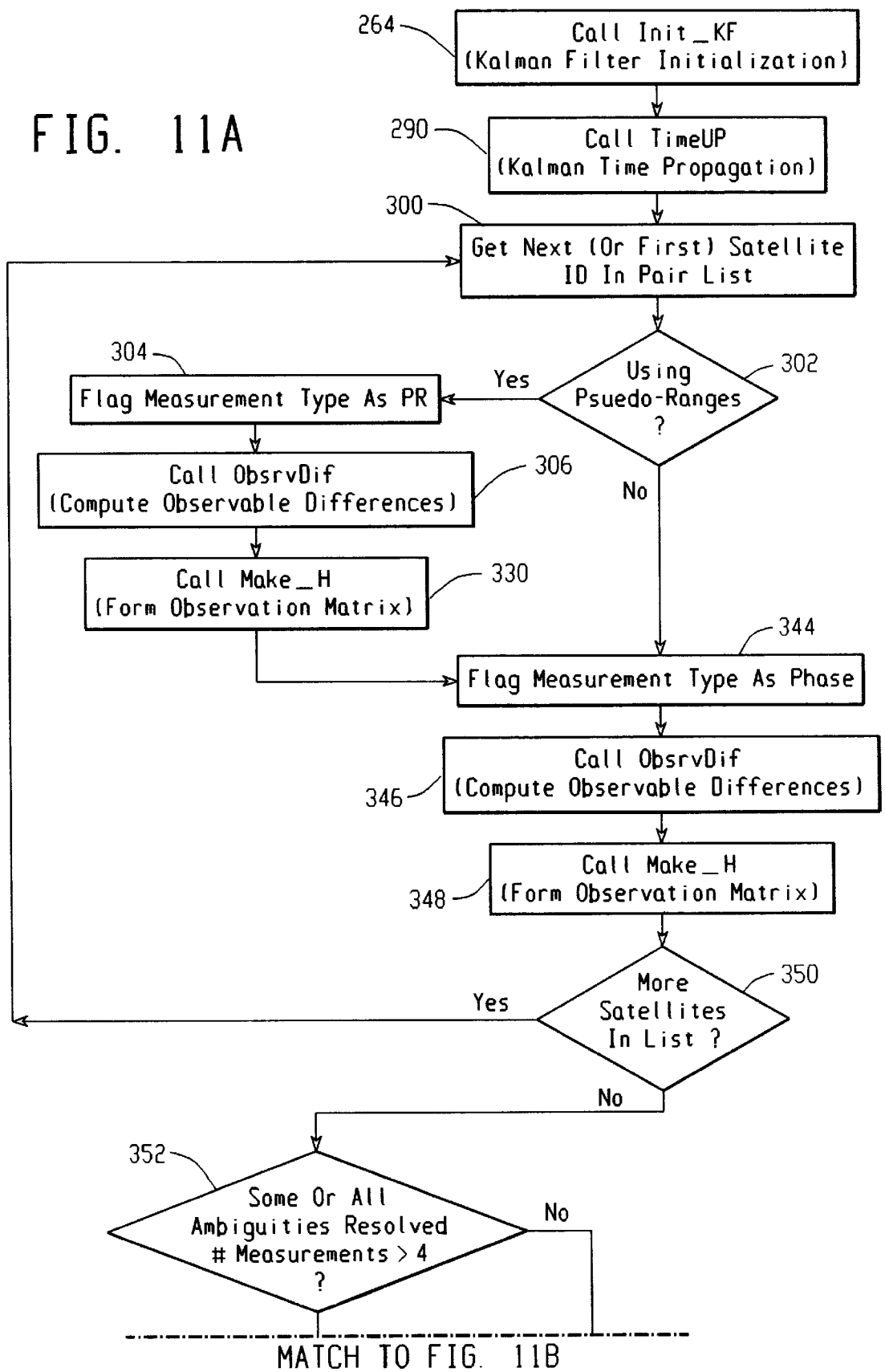
FIGS. 11A–11C show the Kalman filter routine of the GPS system of the present invention.
Figure 11B:
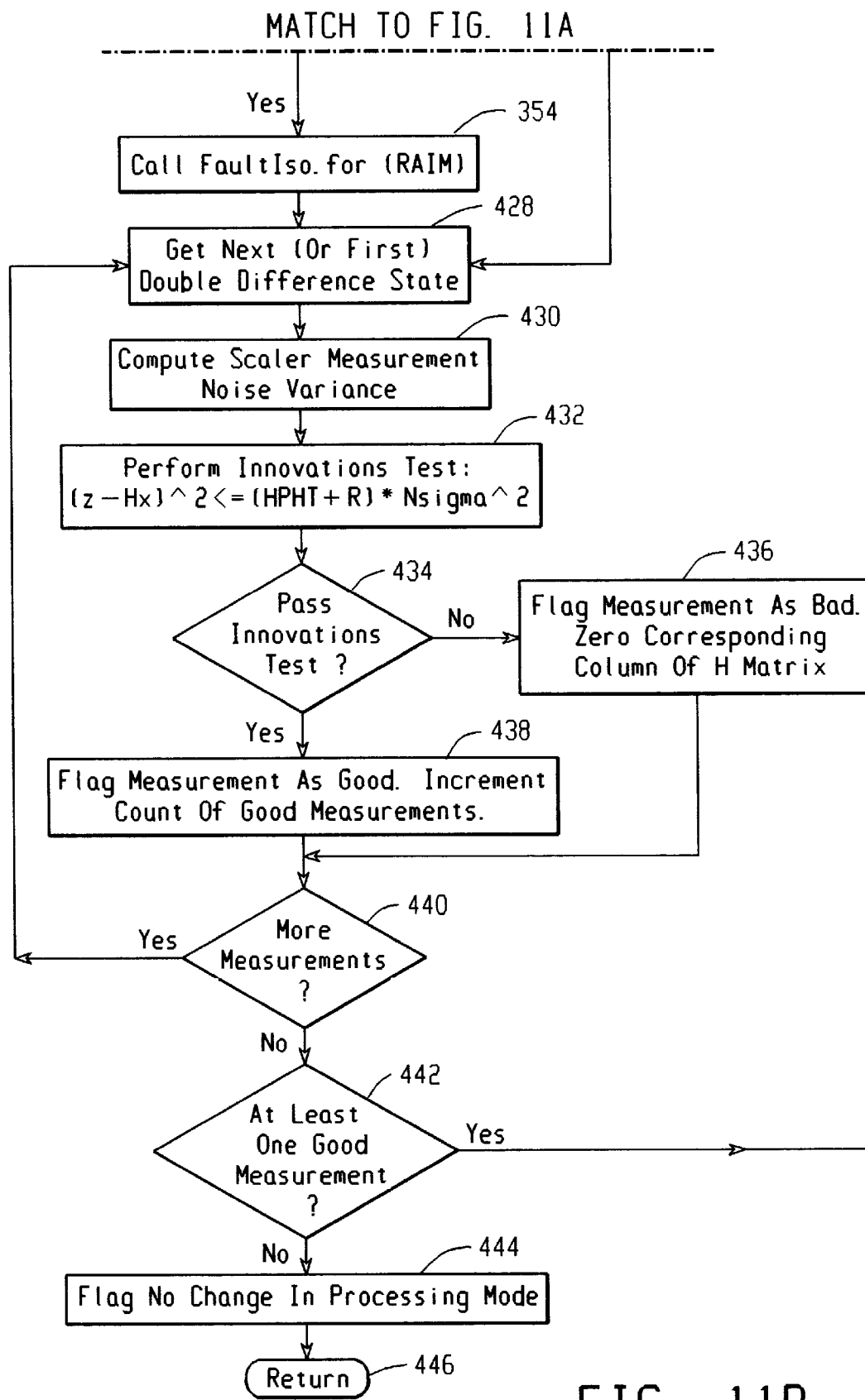
Figure 11C:
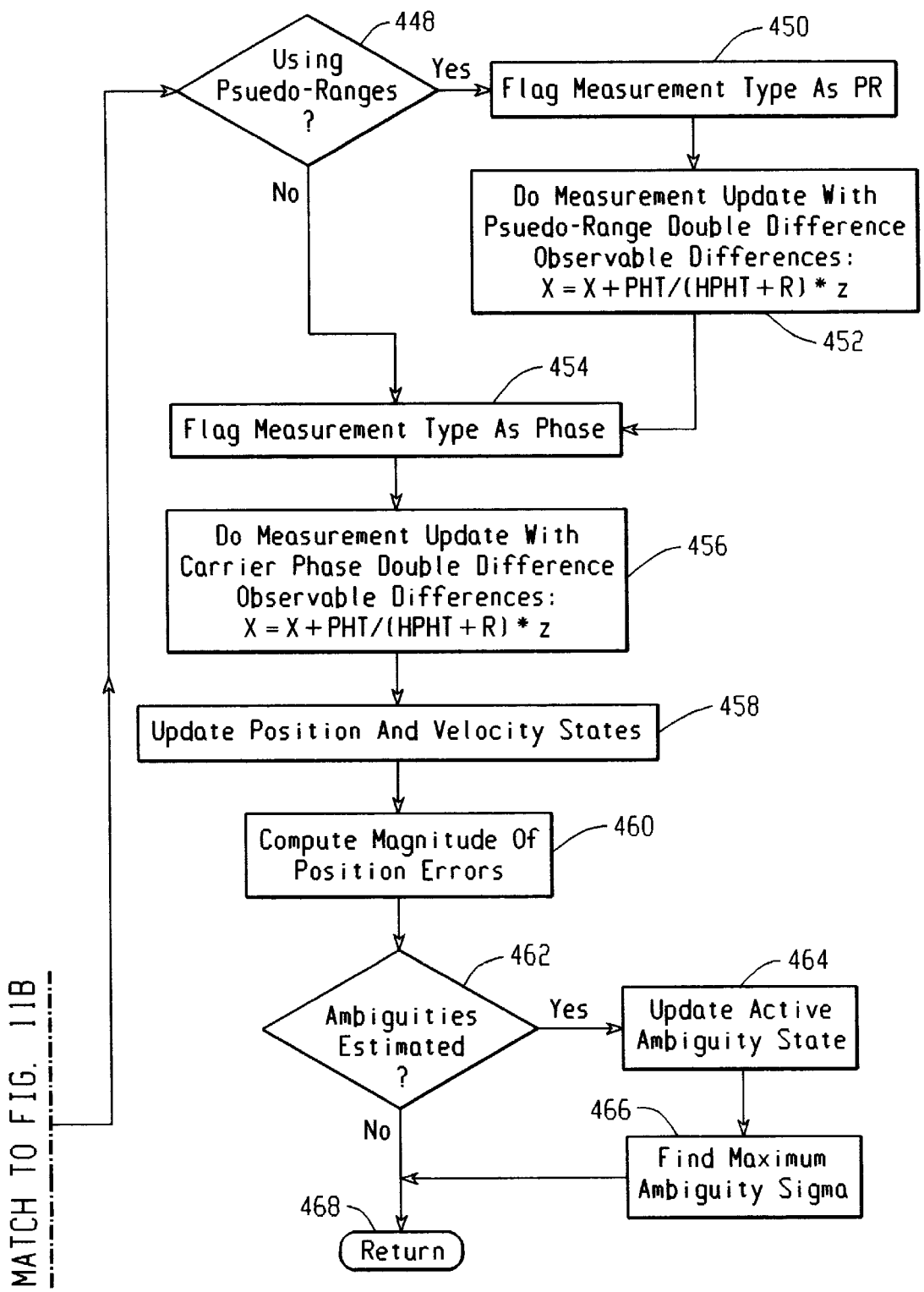
Figure 12:
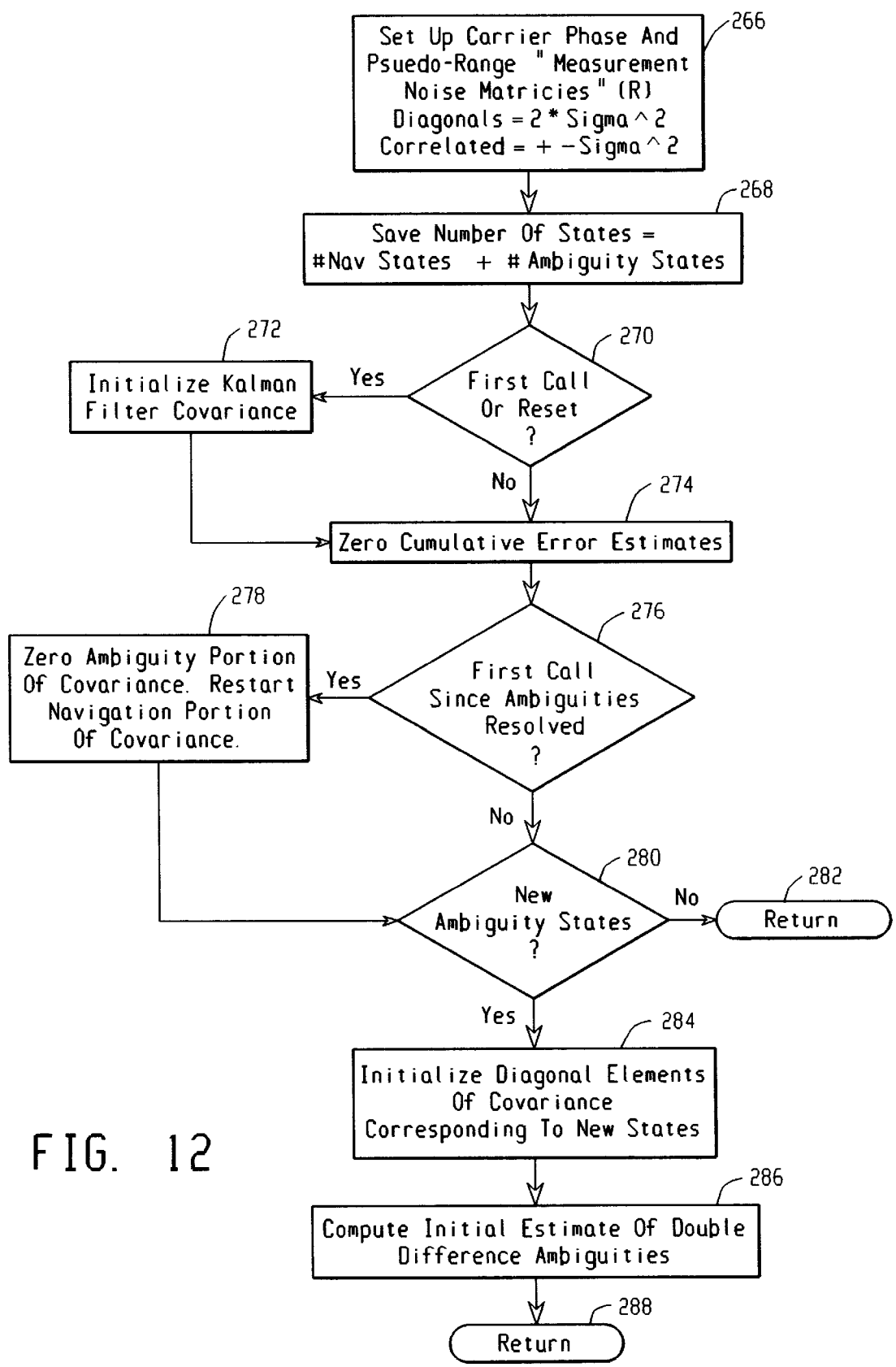
FIG. 12 is a flowchart showing the portion of the GPS system of the present invention that initializes the Kalman filter.

Returning back to FIGS. 9A and 9B, the code next tests, at 260 whether the system 10 is in the mode that estimates the integer ambiguities. If so, the code next calls the routine of FIGS. 11A–11C, which is the Kalman filter routine. Referring now to FIGS. 11A–11C, the routine starts at 264 by calling the routine of FIG. 12, which initializes the Kalman filter. Referring now to FIG. 12, the routine begins at 266 by setting up carrier phase and pseudo-range measurement noise matrices [R], using estimates of the standard deviations of the noise on the measurements, as follows:

For example, pairs (1, 2), (2, 3), (8, 3)

$$[R] = \begin{bmatrix} 2\sigma^2 & -\sigma & 0 \\ -\sigma & 2\sigma^2 & +\sigma \\ 0 & +\sigma & 2\sigma^2 \end{bmatrix} \text{ where: } \sigma = \sigma_{PR} \text{ or } \sigma_\phi$$

In the example, above, there are three double difference pairs, so the [R] matrix is three-by-three. If there are five double difference measurements, the [R] matrix would be five-by-five. The estimates of the standard deviations of the noise on the measurements are calculated as follows:

$$\sigma_{PR} = \sigma_{MIN} + e^{(\sigma MAX - Ei/slope)}$$

where:

$E_i$ is the $i^{th}$ satellite elevation $\sigma_{min}$, $\sigma_{max}$, and slope are inputs, and $\sigma_\phi$ is an input Then at 268, the size of the Kalman filter is determined by adding the number of navigation states (x position, y position, and z position, velocity, and acceleration) to the number of ambiguity states (one for every double difference phase). At 270, the system tests whether this is the first time this routine has been called or if the system has been reset or restarted. If so, the Kalman filter covariance values are initialized to zero covariance, at 272.

Next, at 274, the cumulative error estimates are zeroed. At 276, the system tests whether this is the first call of this routine since the ambiguities have been resolved. If it is the first call since the ambiguities were resolved, then at 278, the ambiguity portions of the covariance are zeroed and the navigation portions of the covariance are reset (restarted with new values along the diagonals and zeros in the off-diagonals). This step at 278 essentially fixes the ambiguities at a particular value because there is no reason to continue estimating them; they are removed from the filter. After this step, or if it is to be skipped, as tested at 276, the system next tests at 280 whether there are any new ambiguity states to be resolved, as would occur when a new satellite is acquired and tracked.

If there are no new ambiguity states, then the routine returns to the calling program at 282. If there are new ambiguity states then at 284 the routine initializes the diagonal elements of the covariance matrix corresponding to these states. Then at 286 the initial estimate of the double difference ambiguities are computed as follows:

$$\nabla \Delta N = (N_i^P - N_j^{iP}) - (N_i^{RR} - N_j^{RR})$$

$N_i^P$ = (ambiguity from participant to $i^{th}$ satellite) = $(PR_i^P/\lambda - \phi_i^P)$ where:

$PR_i^P$ is measured psuedo-range $\lambda$ is $L_1$ wavelength $\phi_i^P$ is measured phase Same for RR (reference receiver)

After the initial estimates of the of the double difference ambiguities are calculated, the routine returns at 288 to the calling program, FIGS. 11A–11C.

Figure 13:
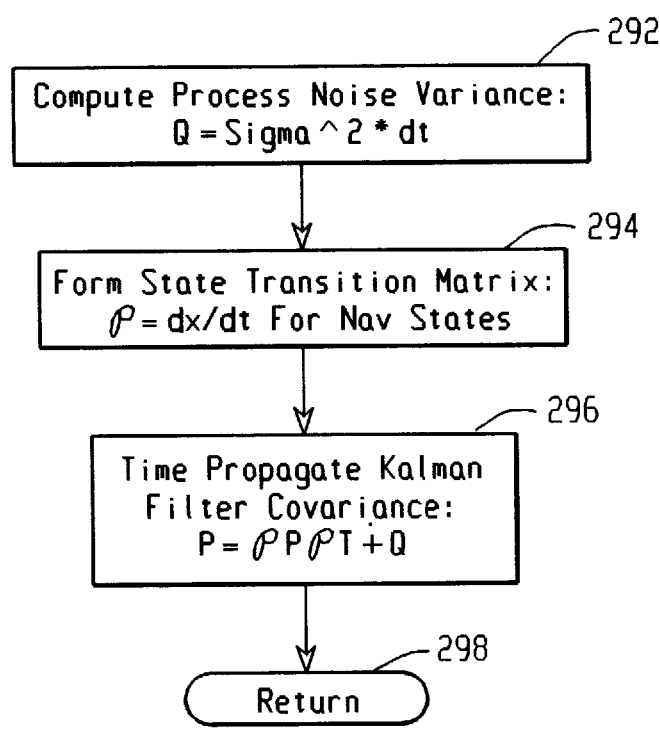
FIG. 13 is a flowchart showing the portion of the GPS system of the present invention that time propagates the Kalman filter.

Referring back to FIGS. 11A–11C, the routine next calls the code of FIG. 13, 290 which time propagates the Kalman filter. Referring now to FIG. 13, this routine begins at 292 by computing the process noise variance matrix, [Q]. In the matrix, all the off-diagonals are zero and the diagonals are the input white noise variance for the states selected in the Kalman filter initialization database squared times the time slice:

$$[Q] = \vec{\sigma}^2 \cdot \Delta t, \, \vec{\sigma}^2 \cdot \Delta t, \, \sigma^{-2} \cdot \Delta t, \ldots$$

The [Q] matrix is essentially an estimate of the noise in the model. The Kalman filter can be configured to estimate position only, position and velocity only, or position, velocity and acceleration by application-specific adjustment of the [Q] matrix diagonal values via the initialization database.

Next, at 294, the state transition matrix is formed as follows:

$$[\Phi] = [I] + \left[ \frac{dx}{dt} \right]$$

where

[I] is the identity matrix

Next, at 296, the Kalman filter covariance is time propagated:

$$[P_t] = [\Phi][P_{tprev}][\Phi]^T + [Q]$$

where

[P] is the Kalman filter covariance

Thereafter, the code returns, at 298.

Referring back to FIGS. 11A–11C, the routine next gets the identity of the first (or next) satellite from the pair list generated above, at 300. At 302, the code branches, depending on whether pseudo-ranges are being used, or not. Pseudo-ranges would be used when integer ambiguities are not resolved. Pseudo-ranges would not be used when the ambiguities are resolved. In either case, carrier phase is used. If the system is using pseudo ranges, then at 304, a flag is set indicating that the measurement type is pseudo range, meaning that 1) no phase integer ambiguity exists in the measurement, and 2) the measurement noise variance is higher than that of carrier phase.

Figure 14:
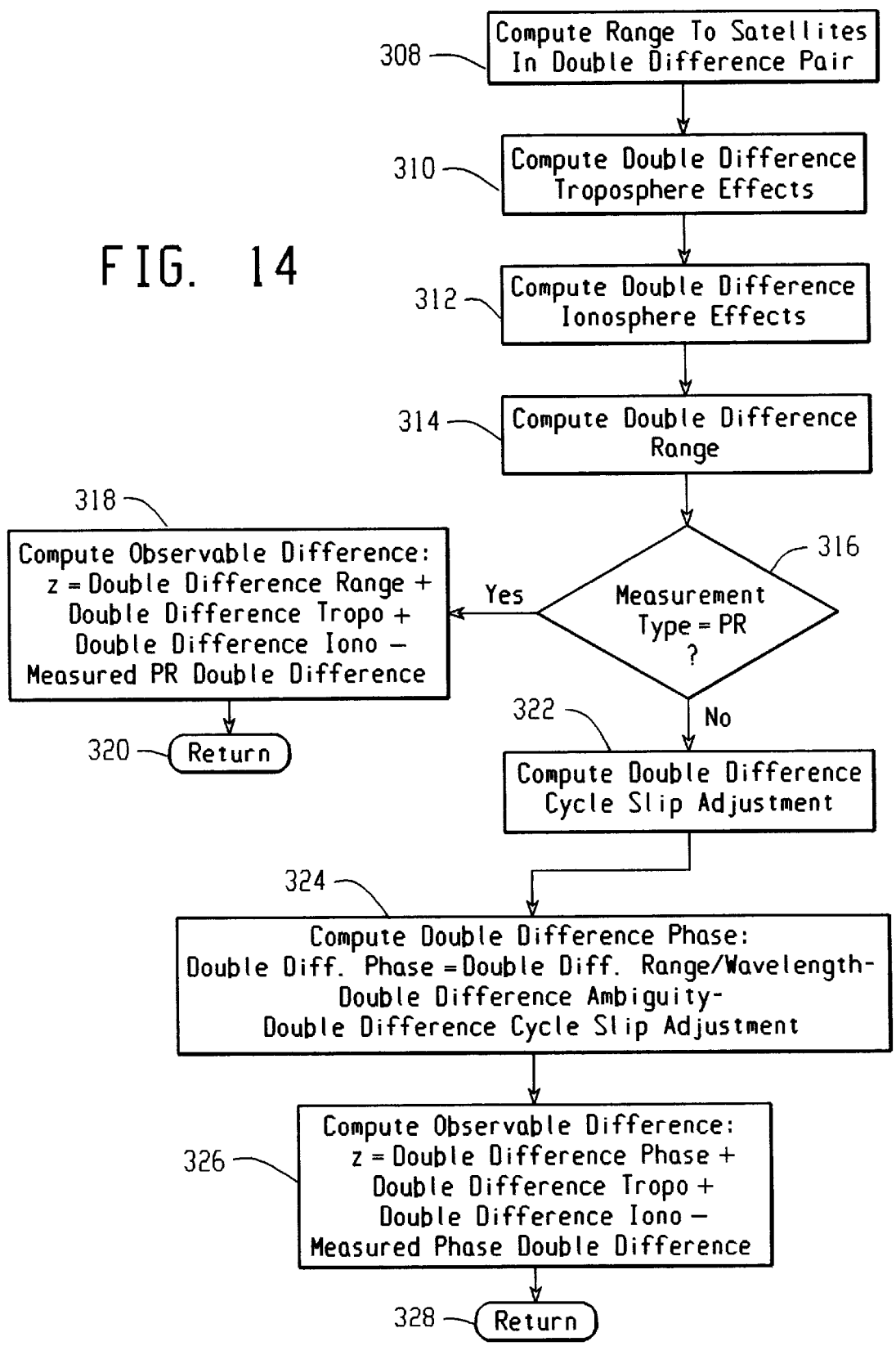
FIG. 14 is a flowchart showing the portion of the GPS system of the present invention that calculates the observable differences for the pseudo-range if pseudoranges are being used or for phase if pseudoranges are not being used.

Next, at 306, the routine calls the code of FIG. 14, which calculates the observable differences for the pseudo-range if pseudoranges are being used or for phase if carrier phases are being used. Before the double differences were calculated from the measured values. And now the system calculates what those measurements should have been. Referring now to FIG. 14, the routine starts at 308 by calculating the range from both receivers to all the satellites in a double difference pair:

$$R_S^R = \sqrt{(x_s - x_r)^2 + (y_s - y_r)^2 + (z_s - z_r)^2}$$

where:

$x_s$=satellite x-coordinate
 $x_r$=receiver x-coordinate
 $y_s$=satellite y-coordinate
 $y_r$=receiver y-coordinate
 $z_s$=satellite z-coordinate
 $z_r$=receiver z-coordinate Next, at 310, the tropospheric effects are calculated as follows:

$$\nabla \Delta \text{Tropo} = (\text{Tropo}_i^P - \text{Tropo}_j^P) - (\text{Tropo}_i^{RR} - \text{Tropo}_j^{RR})$$

The tropospheric (and ionospheric) delay calculations are known to those skilled in the art and are found in public document GPS ICD-200, which is available from common sources. Next, at 312, the ionospheric delay effects are calculated as follows:

$$\nabla \Delta \text{Iono} = (\text{Iono}_i^P - \text{Iono}_j^P) - (\text{Iono}_i^{RR} - \text{Iono}_j^{RR})$$

Finally, the double difference range is calculated, at 314, as follows:

$$\nabla \Delta R = (R_i^P - R_j^P) - (R_i^{RR} - R_j^{RR})$$

Then the code branches, depending on whether pseudo-ranges are being used, at 316, as compared to carrier phase only being used. If pseudo-ranges are being used, then the observable difference is calculated, at 318, by adding the double difference range to the double difference ionospheric and tropospheric effects and subtracting from that the measured pseudorange double difference, as follows:

$$Z_{PR} = \nabla \Delta R + \nabla \Delta \text{Tropo} + \nabla \Delta \text{Iono} - \nabla \Delta PR_{meas}$$

After the observable difference is calculated with pseudoranges being used, the code returns to the calling program, at 320.

On the other hand, if pseudoranges are not being used, as when ambiguities are estimated and have been fixed, then the code continues at 322, where the double difference cycle slip adjustment is calculated:

$$\nabla \Delta CS = (CS_i^P - CS_j^P) - (CS_i^{RR} - CS_j^{RR})$$

Then, at 324, the double difference phase is calculated by subtracting from the double difference range (divided by the L1 carrier wavelength) the double difference ambiguity and the double difference cycle slip:

$$\nabla \Delta \phi = \nabla \Delta R / \lambda - \nabla \Delta N - \nabla \Delta CS$$

Next, at 326, the observable difference is calculated by adding the double difference phase and the ionospheric and tropospheric effects and subtracting from that the measured phase double difference:

$$Z_{100} = \nabla \Delta \phi + \nabla \Delta \text{Tropo} - \nabla \Delta \text{Iono} - \nabla \Delta \phi_{meas}$$

Finally, the code returns to the calling program at 328.

Figure 15:
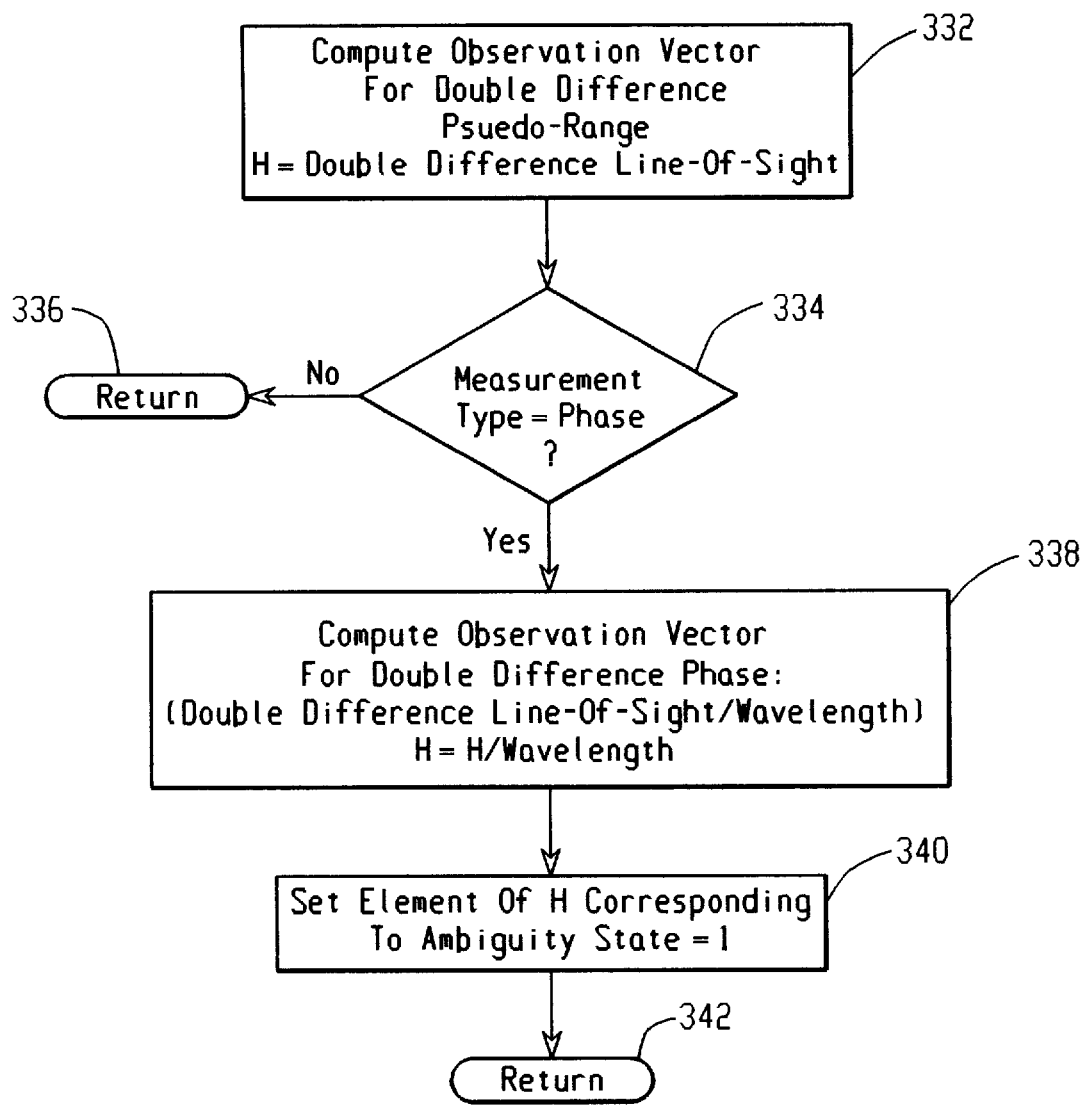
FIG. 15 is a flowchart showing the portion of the CPS system of the present invention that forms the observation matrix.

Referring back to FIGS. 11A–11C, the routine next, at 330, calls the code of FIG. 15, which forms the observation matrix. Referring now to FIG. 15, the routine begins at task 332, which computes the observation vector for the double difference pseudo range. For each double difference pair, the observation element is the double difference line of sight, which is computed above. Thus, the observation vector for the double difference pseudo range becomes:

$$\vec{H}_{PR} = (\Delta \vec{1}_{ij}, 0, 0 \ldots, 0)$$

Then at 334, the system tests whether the measurement type is phase. If it is not, the code returns at 336. If the measurement type is phase, then at 338, the system computes the observation vector for the double difference phase:

$$\vec{H}_\phi = \vec{H}_{PR}/\lambda$$

Thereafter, at 340, the code sets to a value of one (1) the element of H that corresponds to the ambiguity state.

$$\vec{H}_\phi = \vec{H}_\phi + (0,0, \ldots, 1,0,0 \ldots 0)$$

Finally, the code returns to the calling program at 342. The previous routine just created an n-by-m matrix (N states and m measurements) toward the end of eventually creating an n-by-n matrix.

Referring back to FIGS. 11A–11C, this routine next sets the measurement type as phase, at 344, and calls the routines of FIGS. 14 and 15, at 346 and 348, respectively. These routines are described herein in the text accompanying FIGS. 14 and 15. The routines of FIGS. 14 and 15 are executed once with a measurement type that is pseudo range and once with a measurement type that is phase. Thus, functionally, two H matrices are generated—one for pseudo-range and one for phase—but in reality just a single massive H matrix is created.

Then at 350, the system tests whether or not there are more satellites in the list for which the routines of FIGS. 14 and 15 must be executed and if so, program execution branches back up to task 300 the system continues to build the H matrix.

If no more satellites remain, as tested at 350, then the H matrix is complete.

Figure 16A:
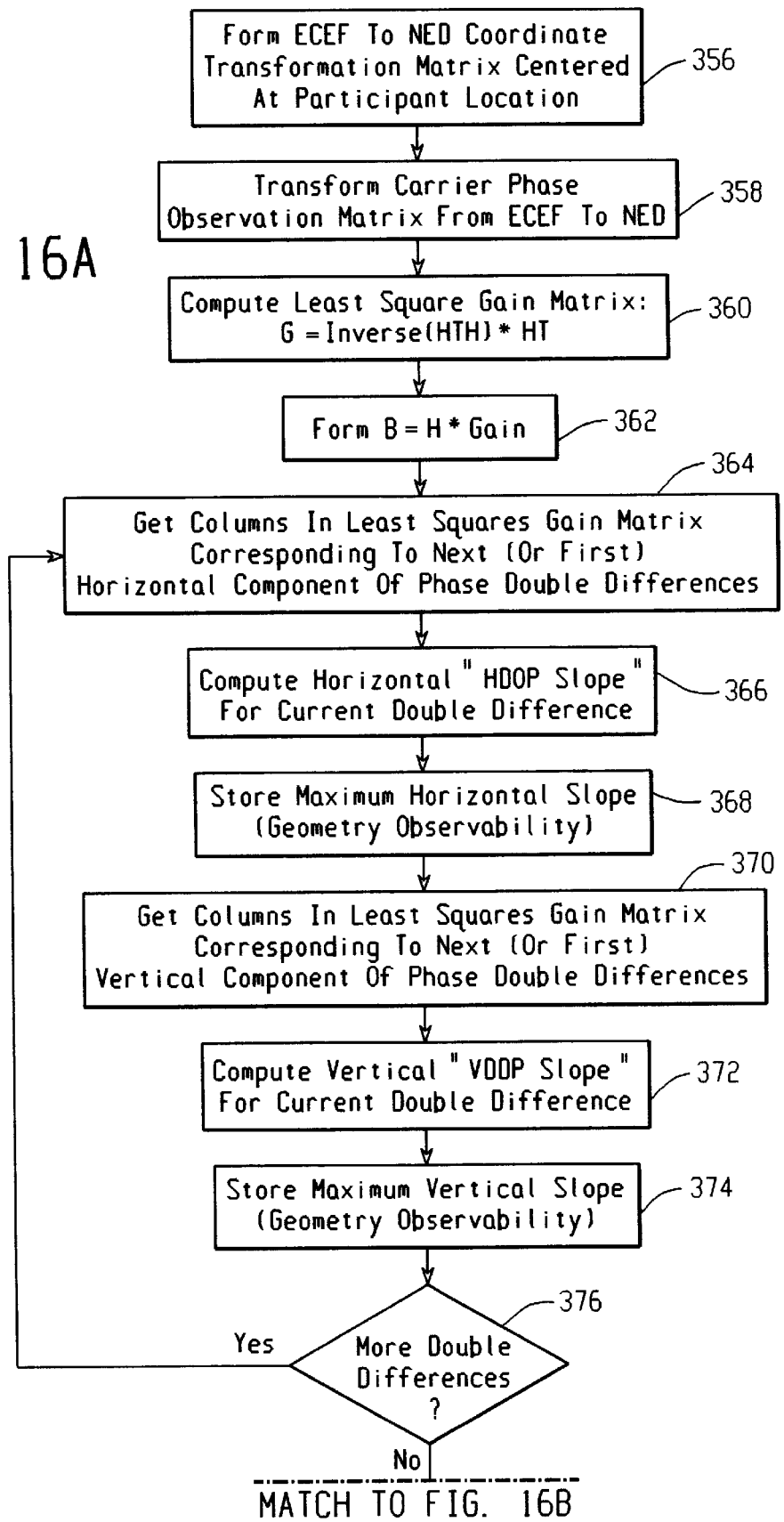
FIGS. 16A–16C are a flowchart showing the portion of the GPS system of the present invention that performs the consistency check routine.
Figure 16B:
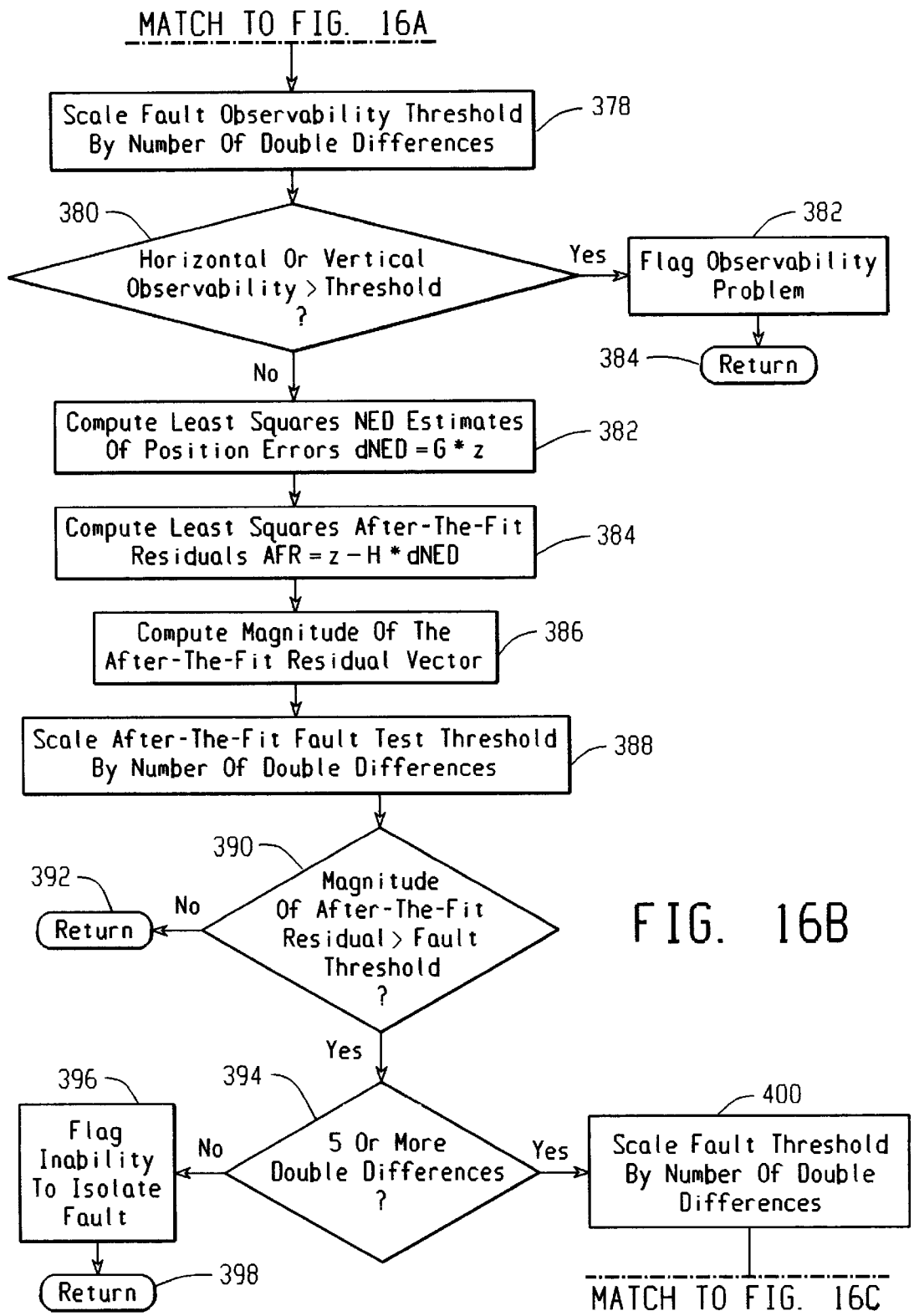
Figure 16C:
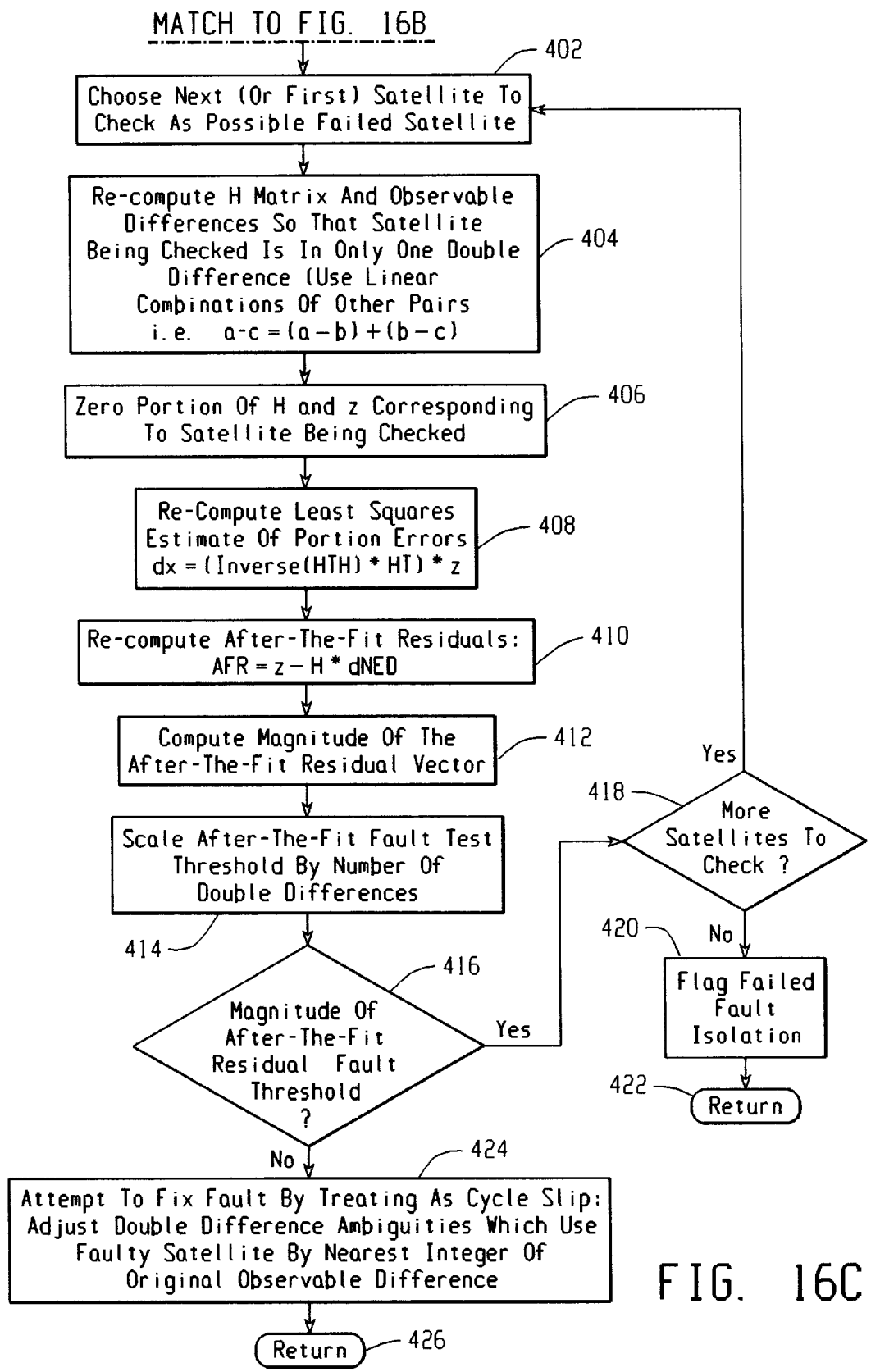

Next, at 352, the system tests whether a sufficient number of the integer ambiguities have been resolved to perform a consistency check on the solutions. In this particular embodiment, if at least four of the integer ambiguities have been resolved, then the consistency check routine of FIGS. 16A–16C is called, at 354. FIGS. 16A–16C show essentially a Receiver Autonomous Integrity Monitoring (RAIM) implementation, modified to the present invention. The RAIM algorithm is a least squares residual test as is known to those of ordinary skill in the art. However, the application of this technique to kinematic carrier phase processing is a novel use of the algorithm particular to the invention.

Referring now to FIGS. 16A–16C, this routine begins at 356 by creating a conversion matrix, $C^e_n$, to convert values from earth centered earth fixed (ECEF) coordinates to north, east, down (NED) coordinates, which is known to those of ordinary skill in the art. Next, at 358, the carrier phase observation matrix is converted from ECEF to NED using the conversion matrix as follows:

$$[H_{100}] = C_n^e \cdot [H_\phi]$$

Then at task 360 the system computes the least squares gain matrix:

$$[G] = ([H]^T[H])^{-1} \cdot [H]^T$$

Thereafter, at 362, another matrix, the b-matrix [B], is formed as follows:

$$[B] = [H_\phi] \cdot [G]$$

Then at 364, the system locates the columns in the least squares gain matrix [G] corresponding to the next or first horizontal component of the phase double differences.

Next, at 366, the system computes the horizontal dilution of precision (HDOP) slope for the current phase double difference, which focuses on the sensitivity to horizontal observations as a function of satellite elevation. If a particular satellite has a steep slope, that means it is important to the horizontal geometry. If that particular satellite is lost by the tracker 63, the solution might be greatly affected. Thus, the system hypothetically drops satellites out of the solution, as though the tracker 63 lost lock on them, and tests the effects on the solution to the integer ambiguities. Basically, if the solution is radically changed by removing a particular satellite, then the system knows the importance of that particular satellite. The importance of a particular satellite refers to weight of position information assigned to that satellite by the geometry. The HDOP slope is calculated as follows:

$$S_H = \sqrt{\frac{(H_{1,i}^2 + H_{2,i}^2) \cdot (N-2)}{1 - B_{ii}}}$$

The code from tasks 366–374 loops, calculating HDOP slope and vertical dilution of precision (VDOP) slope each iteration. It is important to find both maximum slopes. Therefore, at 368, the system stores the maximum horizontal slope, i.e., if the slope this iteration is larger than the previous iteration, then that particular slope is stored.

Tasks 370, 372, 374 are the same to the VDOP slope as tasks 364, 366, and 368 were to the HDOP slope. At 370, the system locates the columns in the least squares gain matrix [G] corresponding to the next or first vertical component of the phase double differences. Next, the system computes the VDOP slope for the current phase double difference, at 372, as follows:

$$S_V = \sqrt{\frac{H_{3,i}^2 \cdot (N-1)}{1 - B_{ii}}}$$

Then, at 374, the system stores the maximum vertical slope, i.e., if the slope this iteration is larger than the previous iteration, then that particular slope is stored. Finally, at 376, the system tests whether there are more double differences to process. If so, then program execution returns to task 364. If no more double differences remain, then the code continues at task 378. After all the double differences are analyzed, the result is a maximum horizontal slope and a maximum vertical slope, which indicate the double difference pair with the maximum sensitivity, i.e., the double difference pair that gives the system the maximum observability in the horizontal and vertical. That is, this routine has identified the double difference pair whose satellite geometries have maximum horizontal slope and maximum vertical slope. The pairs might be the same or might not be the same.

Continuing at 378 the system scales the fault observability threshold by the number of double differences:

$$thres_H = thres/\sqrt{N-2}$$

$$thres_V = thres/\sqrt{N-1}$$

where:
thres is an input
N is the number of measurements
That is the chosen threshold, e.g., 0.1, is adjusted by the number of degrees of freedom; it is scaled by the number of double difference measurements. The horizontal value uses minus 2 because there are two horizontal states and the vertical value uses minus 1 because there is one vertical state.

Then at 380, the maximum vertical and horizontal slopes, which represent the geometry observability, are compared to the scaled fault observability thresholds. If either the horizontal or vertical slope is greater than the scaled fault observability threshold, then a flag is set, indicating an observability problem, at 381, and the code returns, at 382. On the other hand, if both the horizontal or vertical slope are less than the scaled fault observability threshold, then the code continues, at 383.

Continuing at 383, the system computes the least squares northeast down estimates of the position errors:

$$\Delta NED = [G] \cdot \vec{Z}_\phi$$

Then, at 384, the system computes the least squares after-the-fit residuals:

$$\vec{AFR} = \vec{Z}_\phi - \vec{H}_\phi \cdot \Delta NED$$

Next, at 386, the system computes the magnitude of the after-the-fit residual vector:

$$|AFR| = \sqrt{AFR_1^2 + AFR_2^2 + \ldots AFR_N^2}$$

Finally, at 388, the system scales the after-the-fit fault test threshold by the number of double differences:

$$|AFR| = |AFR|/(N-3)$$

A non-zero observable means there was an error in the state estimate. What this is doing is computing a correction to the state estimate and essentially recomputing the computed values and determining computed minus measured again. The system predicted a correction to the state; now the system recomputes what the measurement should be based on those values. Again, this value is scaled back because the magnitude of the after-the-fit residual vector will increase with the number of double difference measurements taken by the system.

Next, at 390, the system 10 determines whether the magnitude of that scaled back after-the-fit residual magnitude is greater than a predetermined threshold, e.g, 0.1 L1 wavelength. And if it is not, then the measured data has passed the test of this particular iteration, so the code returns to the calling program, at 392. On the other hand, if the magnitude of that scaled back after-the-fit residual magnitude is greater than the predetermined threshold, then at least one of the measurements (data from at least one satellite) is erroneous.

Between tasks 356 and tasks 390 the system needs at least four resolved integer ambiguities (at least four phase double differences).

To isolate the problem satellite(s), the system needs at least five double difference phase values, because the system sequentially drops one double difference value out of the calculation, which leaves the system with four values to recompute the scaled after-the-fit residual value, and determine if the problem still exists. If the scaled after-the-fit residual is beneath the predetermined threshold, then the satellite that was removed is the satellite with the erroneous date. Therefore, next, at 394, the system tests whether at least five double difference phase values are available. If not, then the system cannot isolate the satellite with the potential problem and, therefore, a writable flag in circuit communication with the CPU is set to a particular value indicating an inability to isolate the faulty satellite, at 396. Finally, the code returns to the calling program at 398.

On the other hand, if there are at least five double difference phase values available, the system attempts to isolate the faulty satellite starting at 400. At 400, the system re-scales the fault observability threshold by the new number of double differences (scaled for one less satellite) using the calculations associated with task 378. Next, at 402, the system selects the first (or next) satellite to check as the possible failed satellite. The satellite is temporarily discarded by temporarily changing the data corresponding to the satellite being tested, as clarified below. The satellite being tested is merely temporarily changed to be at the end of the double difference pair list so that it is in only one single double difference pair.

Then, at 404, the system recomputes the H matrix, which was computed above, ensuring that the satellite being tested is in only one double difference pair. Thus, the data is temporarily manipulated so that there is one missing double difference. For example, if satellite numbers PRN1, PRN2, PRN3, PRN4, PRN5, and PRN6 are being used, they could be paired as (1,2), (2,3), (3,4), (4,5), and (5,6). Testing either satellite number PRN1 or satellite number PRN6 is straightforward, because these satellites are in only one double difference pair. In testing these satellites, there is no recalculation of the H matrix. The portions of H and z corresponding to the satellite being checked are merely zeroed out in task 406.

On the other hand, testing satellite number PRN3 requires more bookkeeping by the system. The satellite being tested can only be in one double difference pair. To ensure that a particular satellite, e.g., PRN3, is in only one double difference pair, one pair must be discarded, e.g., (2,3). One way to discard this pair is to replace it in H and z with another unique pair formed from two of the satellites not being tested, e.g., (2,6). Therefore, the H matrix must be recalculated with the new double difference pair, (2,6). This can be done by reperforming all the tasks associated with FIGS. 14 and 15.

However, all the calculations associated with FIGS. 14 and 15 need not be performed. In the example above, only one double difference pair using number PRN3—(2, 3)—is discarded, i.e., replaced with another pair, (2,6). The others—(1,2), (3,4), (4,5), and (5,6)—are still valid as originally calculated. Plus, the new double difference pair, (2,6), can be formed from the values being discarded. For example, the $H_{2,6}$ pair is formed as follows: $H_{2,6}=H_{2,3}-H_{3,4}-H_{4,5}-H_{5,6}$. The system uses this method with respect to the H matrix and the double differences to create new pairs out of the two pairs that have been temporarily discarded.

Also at 404, the observable differences are either completely recalculated, or, preferably, they are calculated from the discarded values, as follows. Thus, in task 404, the system has analyzed the list of double difference pairs and ensured that the satellite being tested is used in only one double difference. So, if the satellite being tested had been chained together (and thereby formed two double differences) then one of the two double difference pairs is replaced with another unique one, formed by two of the satellites not being tested. H and z were either recomputed, or manipulated so as to appear recomputed, with the new pair.

Thereafter, at 406, the portions of H and z corresponding to the satellite being isolated (tested) are set to zero. The previous step resulted in at least a five-by-five matrix. This is changed to be a four-by-four matrix by zeroing out the one row and the one column associated with the satellite being tested. Continuing at 408, the system 10 re-computes the least squares northeast down estimates of the position errors, with one satellite isolated (removed):

$$\Delta NED=[G]\cdot\vec{Z}_\phi$$

Then, at 410, the system re-computes the least squares after-the-fit residuals, with one satellite isolated (removed):

$$A\vec{F}R=\vec{Z}_\phi-\vec{H}_\phi\cdot\Delta NED$$

Next, at 412, the system re-computes the magnitude of the after-the-fit residual vector, with one satellite isolated (removed):

$$|AFR| = \sqrt{AFR_1^2 + AFR_2^2 + \ldots AFR_N^2}$$

Finally, at 414, the system re-scales the after-the-fit fault test threshold by the new number of double differences:
Ti |AFR|=|AFR|/(N−3)

Next, at 416, the system 10 determine whether the magnitude of that scaled back after-the-fit residual magnitude, as re-calculated with one satellite isolated (removed) is greater than a predetermined error threshold, e.g, 0.1 L1 wavelength. And if it is not, then the measured data has passed the test of this particular iteration with this particular satellite isolated (removed), so the code next tests, at 418, whether more satellites remain to be isolated (tested) in the search for the satellite with erroneous data. If more satellites remain, then the code branches to task 402 to begin testing the next satellite. Task 404 is performed using the full set of data, not the reduced set of data from any previous iterations. In the alternative, if a sufficient number of satellites are available, tasks 400–418 can be performed with more than one satellite isolated (removed) to attempt to isolate two satellites with erroneous data.

If no more satellites remain to be tested, then at 420 a value is written to a flag, in circuit communication with the CPU, indicating that the routine of FIGS. 16A–16C was not successful in isolating the satellite with the faulty measured data. Finally, the code returns to the calling program, at 422.

On the other hand, if the magnitude of the scaled back after-the-fit residual magnitude is greater than the predetermined threshold, as tested at 416, then at least one of the satellite measurements (phase data from at least one satellite) is erroneous. Therefore, the system 10 attempts to correct the erroneous data, at 424 by treating the error as a cycle slip. This value is added to the measurement for that particular satellite. Finally, at 424, the double difference ambiguities using the faulty satellite are adjusted by adding to them the original observable differences, as calculated at task 326, rounded to the nearest integer.

Essentially, at 424, the system assumes that the error in the prediction of the measurement (z) is not an error in position, but an error in the measurement, instead, e.g., the number of cycles was not counted by the tracking processor 42 properly. Consequently, the system takes that error (z), determines how many phase cycles the error represents, and adds that number of cycles to the cycle slip value, which is eventually used to adjust the actual phase measured by the tracker 63 for that particular satellite. Thus, next time the observable difference are computed, the system adjusts the observable difference by that many cycles.

Once the integer ambiguities are resolved, the z value should be a fraction of a cycle. That is why the system only performs this check once it has resolved at least some of the integer ambiguities. If, however, the z value is a larger number of whole cycles off, then there is a problem somewhere. For example, a particular double difference phase involving satellite PRN3 might have a double difference observable difference (z) computed at 4.5 cycles or 4.3 cycles. Since the tracker 63 can only be off by an integer number of whole cycles the system assumes that it is off by 4 cycles. From that point on, whenever the system forms the predicted values that use double difference ambiguities plus the phase measurement, the system adjusts the integer ambiguities at that point by four cycle slips.

Thereafter, the code returns to the calling program at 426.

Referring back to FIGS. 11A–11C, the code next performs an innovations test loop at tasks 428, 430, 432, 434, 436, and 438, which computes a scalar measurement noise for the system, as compared to the measurement noise matrix generated in the code beginning at task 264. The code loops once for each measurement for all the measurements: both pseudorange measurements and phase measurements. Being an innovations test, this portion determines whether or not the measurement being tested improves the estimate of integer ambiguity or not. Essentially, the system is analyzing each measurement and determining whether or not that particular measurement is a usable measurement. Beginning at 428, the system locates the first (or next) double difference state (double difference value for either phase or pseudorange).

Next, at 430, the system determines the scalar measurement noise variance, for either phase or pseudo-range, as appropriate, as follows:

$$R = 2\sigma_\phi^2$$

or $$R = 2\sigma_{PR}^2$$

Next, the system 10 performs the innovations test calculations by calculating both sides of the comparison:

$$Z - \vec{H} \cdot \vec{X} \leq (\vec{H}[P](\vec{H})^T + R) \cdot \sigma_{TEST}^2$$

where:
$\sigma_{TEST}$ is an input
R is as calculated above
[P] is the Kalman filter covariance
$\vec{X}$ is the Kalman state vector
Z is $Z_{PR}$ or $Z_\phi$
H is $H_{PR}$ or $H_\phi$ Then, at 434, the system tests whether the above comparison is true. If not, then the measurement is flagged as bad and the corresponding column of the H matrix is set to all zeros, at 436. If the above comparison is true, then the measurement is flagged as "good" and a counter that represents the number of good measurements is incremented, at 438. Next, at 440, the system tests whether there are more measurements to process by the routine of tasks 428–438. If so, then the code branches to 428 to get the next double difference state.

If there are no more measurements to process, then the system 10 next, at 442, tests whether there was at least one measurement flagged as "good" at task 438. If no measurements were flagged as good, then the system 10 sets a flag indicating that no change to the processing mode was made, at 444, and the code returns to the calling program, at 446.

On the other hand, if the test at 422 indicates there was at least one good measurement, as determined above, and the system 10 continues to task 448. At 448, the code then branches, depending on whether pseudo-ranges are being used. If the system has not resolved the ambiguities, i.e., if there are any unresolved integer ambiguities, then the system uses pseudo-ranges. If pseudoranges are being used, then the measurement type is flagged as pseudo-range, at 450, and the system 10 performs a measurement update with the pseudo-range double difference observable difference:

$$\vec{X} = \vec{X} + \Delta \vec{X}$$

$$\Delta \vec{X} = \left( \frac{[P][H]^T}{[H][P][H]^T + [R]} \right) \cdot \vec{Z}$$

After the pseudo-range update is done, or if the system is not using pseudo-ranges, the system flags the measurement type as phase at 454. Next, at 456, the system performs the same calculation discussed at task 452 with carrier phase:

$$\vec{X} = \vec{X} + \Delta \vec{X}$$

$$\Delta \vec{X} = \left( \frac{[P][H]^T}{[H][P][H]^T + [R]} \right) \cdot \vec{Z}$$

Then, at 458, the system updates the position and velocity states and updates the co-variance matrix.

Next, at 460, with the updated covariance matrix the system determines the magnitude of the position error, which essentially is an examination of the covariance matrix to determine the accuracy of the calculated position value:

$$\sigma_p = \sqrt{\sigma_x^2 + \sigma_y^2 + \sigma_z^2}$$

At 462, the system determines whether the integer ambiguities have been estimated. If so, then the system updates the active ambiguity state at 464 and determines the maximum ambiguity sigma, at 466.

Thereafter, and if the system is still estimating ambiguities, the code returns to the calling program, at 468.

Referring back to FIGS. 9A and 9B, the system next, at 470, tests whether the magnitude of the maximum ambiguity sigma, calculated at task 466, is less than a predetermined threshold, e.g., 0.1 L1 wavelength. The bigger the predetermined threshold is, the sooner the system will try to resolve the integer ambiguities, but the bigger the search space will be. The smaller the predetermined threshold is, the later the system will try to resolve the integer ambiguities, but the search space will be smaller. Thus, the threshold involves a trade-off. Preferably, one-tenth of a wavelength is used as the threshold. If the magnitude of the maximum ambiguity sigma is not less than the predetermined threshold, then the code returns to the calling program, at 472. On the other hand, if the magnitude of the maximum ambiguity sigma is less than the predetermined threshold, then the system has whittled the ambiguities to an acceptably small level, and the system continues, at 474, by calling the routine of FIG. 17, which finally resolves the ambiguities.

Figure 17:
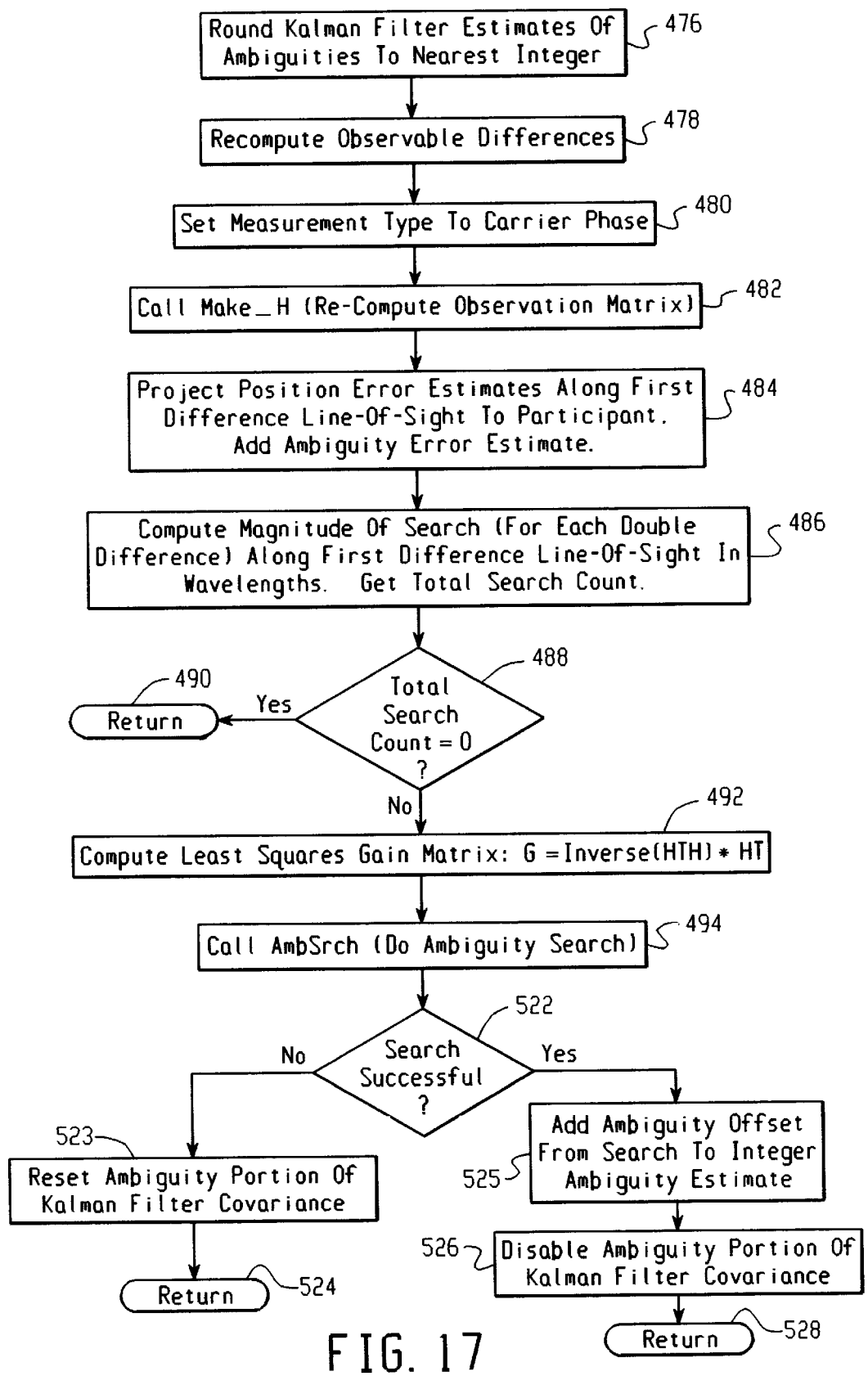
FIG. 17 is a flowchart showing the portion of the GPS system of the present invention that resolves the integer ambiguities.

Referring now to FIG. 17, the routine that resolves the ambiguities starts at 476 by rounding off the Kalman filter estimates of the integer ambiguities to the nearest integer. Then, the observable differences are re-computed, at 478, as follows:

$$\vec{Z}_\phi = \nabla \Delta \vec{\phi}_{computed} - \nabla \Delta \vec{\phi}_{measured}$$

Next, at 480, the measurement type is set to carrier phase and the routine of FIG. 15 is called, at 482, which recomputes the observation matrix, H. After that routine returns the system continues at 484 where the position error estimates are projected along the first difference line of sight to the participant, $$\sigma_{i,j} = \vec{1}_{i,j} \cdot \vec{\sigma}_{x,y,z}$$

and the ambiguity error estimate is added. These calculations are being performed using cycles as the unit. Essentially, here the integer ambiguity estimate has an x error, a y error, and a z error and the system is taking the component of the x along the line of sight and the component y along the line of sight, and the component z along the line of sight and adding those altogether because each error projects into the line of sight. For example, the data has an x error of 2 cycles, a y error of 4 cycles and a z error of 3 cycles and the system projects those errors down the line of sight. If the satellite is right along the z axis, then the x and y errors would have no contribution; the line of sight is solely the z error. Once the position error is projected down the line of sight, the integer ambiguity error estimate is added to it. The position error projected down the line of sight might produce, e.g, 2.7 cycles of error. To this, the, e.g., 0.1 cycle of ambiguity error estimate is added to produce 2.8 cycles. At this stage, the system is determining the size of the search for the integer ambiguities. If the system has determined that all the errors combined are less than 3 cycles in a particular direction, there is no reason to search out to 4 or 5 or 6 cycles in that direction.

At 486 the system computes the magnitude of the search for each double difference along the first difference line of sight in wavelengths, $$\vec{S} = \|\sigma_{i,j} \cdot M\|$$

and sums the total of the search count:

$$\|S\| = \sum_{i,j} \|\sigma_{i,j} \cdot M\|$$

where:

M is input search multiplier

Then, at 488, the system determines whether the total search count generated immediately above equals zero. If so, the code returns to the calling program, at 490.

If the total search count is not zero, then the code continues at 492 by computing the least squares gain matrix, G, as follows:

$$[G] = ([H]^T [H])^{-1} \cdot [H]^T$$

Figure 18:
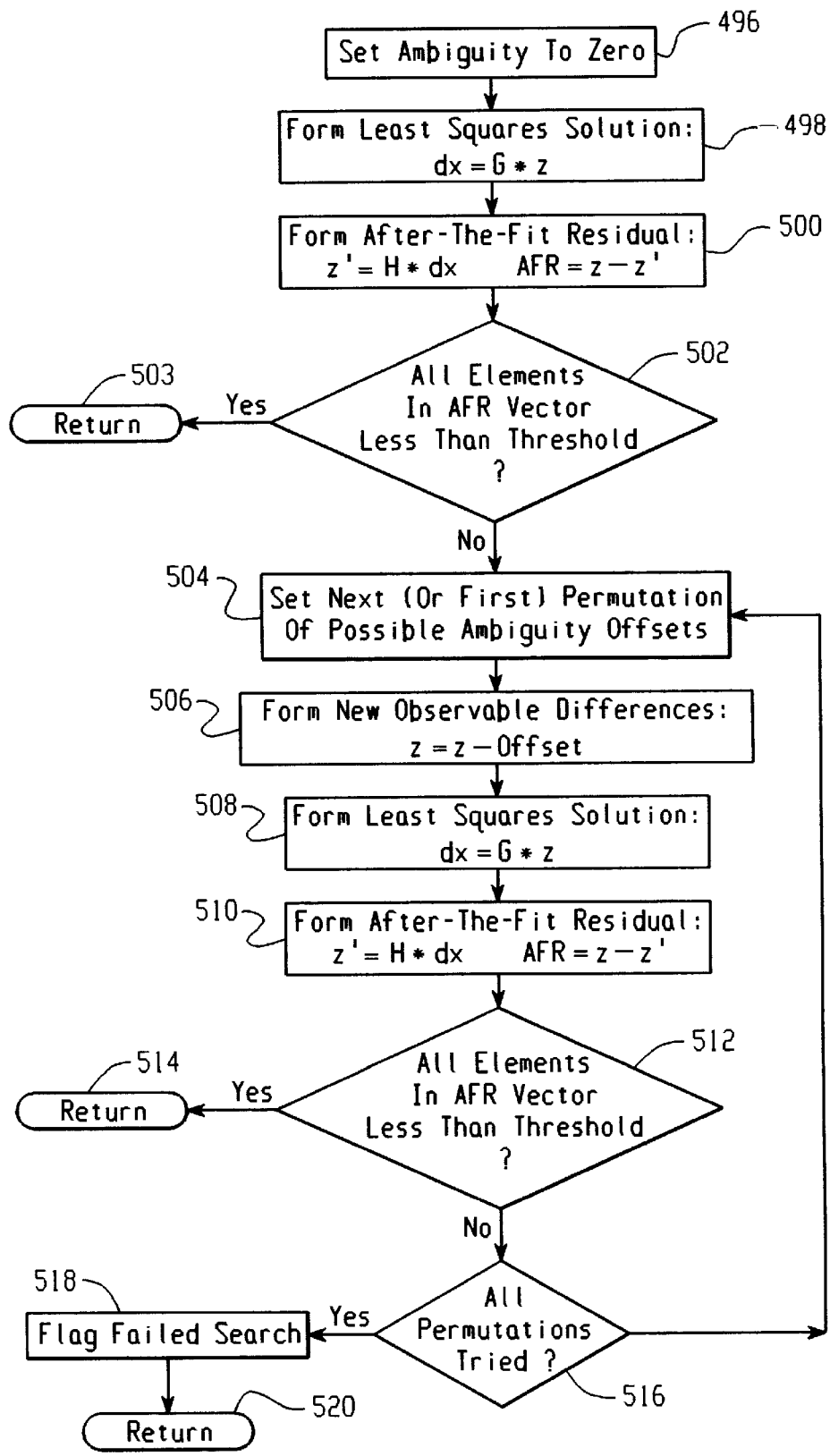
FIG. 18 is a flowchart showing the portion of the GPS system of the present invention that performs the ambiguity search.

Then, the routine of FIG. 18 is called, at 494, which performs the ambiguity search.

Referring now to FIG. 18, the code begins at 496 by setting (initializing) the ambiguity offset to zero:

$$\vec{n} = \vec{0}$$

Then at 498 the system forms a least squares solution:

$$\vec{\Delta x} = [G] \cdot \vec{Z}_\phi$$

Thereafter, at 500, the system forms the after-the-fit residual:

$$A\vec{F}R = \vec{Z}_\phi - [\vec{H}_\phi] \cdot \vec{\Delta X}$$

Next, at 502, the system determines whether all elements in the after-the-fit vector are less than a predetermined threshold, e.g., 0.1 L1 wavelength. If so, then the ambiguity search was successful, and the code returns, at 503. If all the elements in the after-the-fit vector are not less than the predetermined threshold, then the code next begins at 504 a loop to test other possible permutations for the integer ambiguities.

At 504, the first (or next) permutation is selected. These permutations are, for example, $$\vec{n}_1 = (0,0,0, \ldots 0,1)$$

$$\vec{n}_2 = (0,0,0, \ldots 1,0)$$

.
.
.

$$\vec{n}_n = (1,1,1, \ldots 1,1)$$

Where n! denotes the value "n factorial."

Essentially, if the count in one direction is five and your count in the other direction is 2, the system calculates the after-the-fit residual for the following: (0,0), (0,1), (0,2), (1,0), (1,1), (1,2), (2,0), (2,1), (2,2), (3,0), (3,1), (3,2), (4,0), (4,1), (4,2), (5,0), (5,1), and (5,2). At this stage, there is no particular starting place, because any one permutation is as likely as any other to be the correct permutation. At this stage in the processing, it is desirable that most of these numbers are zeros, with a few of them being ones, which is why the system attempts to lower the sigma value down.

Next, at 506, the system forms a new observable difference, as before:

$$\vec{Z}_\phi = \vec{Z}_\phi - \vec{n}_i$$

Then at 508 the system again forms the least squares solution:

$$\vec{\Delta X} = [G] \cdot \vec{Z}_\phi$$

Again, at 510, the system forms the after-the-fit residual:

$$A\vec{F}R = \vec{Z}_\phi - [H_\phi] \cdot \vec{\Delta X}$$

Next, at 512, the system again determines whether all elements in the after-the-fit vector are less than a predetermined threshold, e.g., 0.1 L1 wavelength. If so, then the ambiguity search was successful, and the code returns, at 514. If the system finds one permutation that is acceptable, there is no reason to test any of the other permutations or to look for the best permutation. If the threshold is set to an appropriate value, the system need only one permutation that is acceptable for the search to have been successful. If all the elements in the after-the-fit vector are not less than the predetermined threshold, then the code next tests whether all the permutations of possible ambiguity offsets have been tested, at 516. If not, then program execution branches up to task 504 to begin testing the next permutation. If all the possible permutations have been tested, and still some of the elements in the after-the-fit residual vector are greater than or equal to the threshold, then a flag is set at 518, indicating that the search for the integer ambiguities has failed, and the code returns to the calling program, at 520.

Returning back to FIG. 17, at 522 the system next tests whether the search was successful. If not, the system resets the ambiguity portion of the Kalman filter covariance at 524, which essentially involves resetting the ambiguity states and their cross-correlations. Then, the code returns to the calling program, at 526.

On the other hand, if the ambiguity search was successful, the system then adds the ambiguity offset from the search to the integer ambiguity estimate, at 524, as follows:

$$\vec{\nabla}\vec{\Delta}N = \vec{\nabla}\vec{\Delta}N + \vec{n}_i$$

The system had an estimate of the integer ambiguity that was rounded to the nearest integer. The estimate is now adjusted based on the search for the permutation with the best fit. Lastly, the system disables the ambiguity portion of the Kalman filter covariance at 526 because the system has determined the integer number of L1 phase cycles between the satellite and the receivers when the process first started. Unless something happens like the tracker 63 loses lock on a satellite or a satellite jumps out of view or something like that, then the system continues its calculations using only phase data from the tracker 63.

Thus, the system disables the ambiguity determining routine at that point. Later on, if a new satellite appears in view, then the system brings in only one double difference ambiguity state. The system does not bring all of the double difference ambiguity states back.

Thus, at 528 the code returns to the calling program.

Referring back to FIGS. 9A and 9B, the system next tests whether the integer ambiguities were successfully resolved, at 530. Of not, the code returns to the calling program, at 532. If so, then the system changes the mode flag to indicate that further processing will be done only on phase data (sets the mode to phase processing only), at 534, and the code returns to the calling program, at 536.

Referring back to task 260 of FIG. 9A, if the system is not estimating all the integer ambiguities, processing continues at 540, where the system checks if the system is in the phase processing only mode. If so, the system calls the routine of FIGS. 11A–11C, which show the Kalman filter routine, at 542. This is the same routine that was described in the text accompanying FIGS. 11A–11C and has several subroutines that were also previously described.

After the routine of FIGS. 11A–11C returns, the system next at 544 checks if the position sigmas are less than a predetermined threshold, e.g., 1.0 meter. Because the system is in a mode of only processing phase data from the tracker 63, this threshold is different from the other thresholds used herein. This is because the integer ambiguities have been resolved.

If the position sigmas are beneath the predetermined threshold then the system is still correctly processing phase data only and code returns at 546. If not, then something is wrong with the current processing and the data is effectively reset, at 548, and the code returns to the calling program, at 550.

Referring back to the test at 540, if the system is not just processing phase only then the system continues at 552 where it queries whether or not the system is in a mode in which it estimating only new ambiguities. If not, the code returns to the calling program, at 554.

If the system is in a mode in which it is estimating only new integer ambiguities, then at 556 the Kalman filter routine of FIGS. 11A–11C is called at 556. After that routine runs, at 558 the system queries whether the ambiguity sigmas are beneath the predetermined threshold as described above. If not, the code returns to the calling program, at 560. If the integer ambiguities are less than the predetermined threshold, then the routine for resolving the ambiguities of FIG. 17 is called, at 562.

After that routine executes, the system queries whether the ambiguities were successfully resolved, at 564, as it was done at task 530. If not, the code returns to the calling program, at 566. If the integer ambiguities were successfully resolved, the system changes the processing mode to phase processing only, at 568, and returns to the calling program, at 570.

Referring back to FIG. 2, the system writes output at 572. In the preferred embodiment, the output is transmitted to the display unit 36 via the display communications link 38. A suitable numeric display is a control display unit (CDU). One suitable CDU is IEC Model 9002 FMS CDU (not shown), which is available from Interstate Electronics Corp., 1001 East Ball Road, Anaheim, Calif. 92803-3117, the assignee of the present invention, as part number 7601000. The output can be the time, position, velocity and acceleration of the participant antenna. Alternatively, position and track deviation data can be displayed. The exact form of the display depends upon the platform on which the algorithm of the present invention is operated. For example, a general purpose computer calculating position using software based on the present invention may output ASCII character records with the desired information. Thereafter, the code continues by jumping back up to task 100 and data collection and processing begins again.

Figure 19:
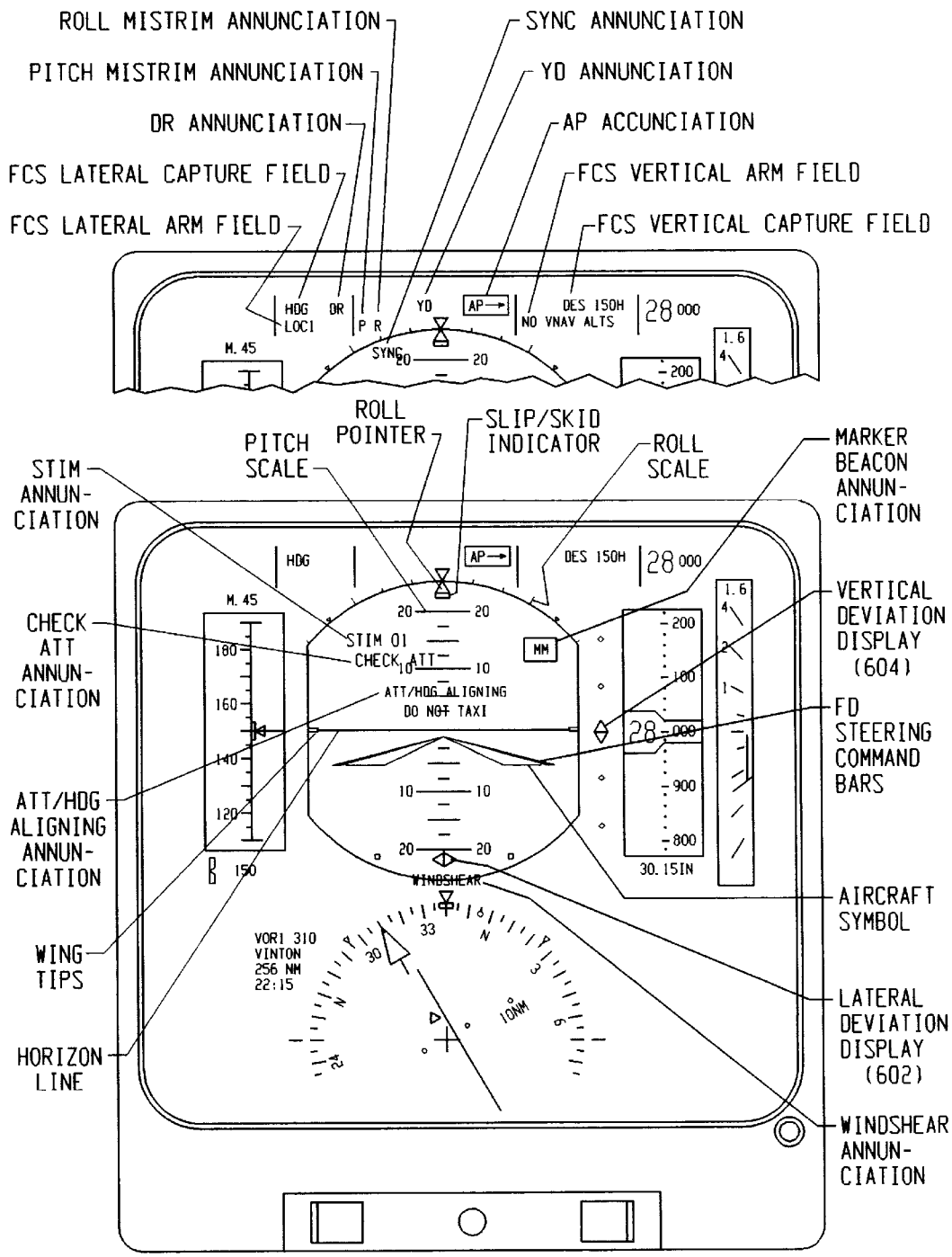
FIG. 19 is an elevation of a display unit used in the GPS system of the present invention.

Another suitable display is an electronic flight information system (EFIS) an example of which is shown as 600 in FIG. 19. In an EFIS 600, lateral and vertical track deviation information can be graphically displayed on the associated lateral deviation display 602 and vertical deviation display 604, with their pairs of triangles indicating direction of the deviation and smaller diamonds indicating the magnitude of the deviation. Suitable EFISs include Rockwell Collins EFIS model nos. EFD-4077 and EFIS-84, which are available from Collins General Aviation Division, Rockwell International Corporation, Cedar Rapids, Iowa 52498. Such an EFIS can be the display unit 36 and be connected via the display communications link 38. The deviations can be determined by comparing the determined time, position, velocity and acceleration with predetermined or other desired values. Such predetermined or desired parameters can be e.g., entered by a user in real time or stored beforehand in a suitable medium in circuit communication with one of the processors 40, 42, 44, e.g., in the I/O FLASH memory 86.

Using the GPS system of the present invention is relatively straightforward. First, the reference GPS receiver 16 of the reference subsystem 12 is positioned in a fixed location and its processors are programmed to receive GPS signals 19 from a plurality of satellites, determine CA code and carrier phase for each satellite, and transmits the reference receiver antenna location and the CA codes and carrier phases to the participant subsystem 14 via the telemetry signal 23 transmitted by the radio modem transmitter 20 and received by the radio modem receiver 30. The position of the reference antenna 18 must be very accurately determined, as known to those skilled in the art of DGPS. This accurate position is utilized by the system 10 of the present invention in the construction of the predicted (expected) double differenced measurements for the Kalman filter, thus removing the GPS errors.

The participant subsystem 12 is positioned on a participant platform, such as an aircraft or a land-based vehicle. The tracker 63 of the participant GPS receiver 26 of the participant subsystem 12 is programmed to receive GPS signals 19' from a plurality of satellites, determine CA code and carrier phase for each satellite, and transmits the code phase and carrier phases to the navigation processor 40 via the tracking-navigation FIFO memory 62. The radio modem receiver 30 receives the telemetry signal 23, which is passed to ASIC#0. The CA code and carrier phase from the reference subsystem 12 is passed to the navigation processor 40.

The navigation processor 40 is programmed to determine the pseudorange and carrier phase, and then determine the integer ambiguity for each satellite pursuant to the routines of FIGS. 2–18. Thereafter, the navigation processor 40 and/or the I/O processor 44 determines any other desired parameters, such as course deviations, and the I/O processor the transmits the formatted data output to the display unit 36 via the display communications link 38. As satellites fade from view and come into view, both receivers 16, 26 adjust their respective outputs as disclose herein and as otherwise known to those skilled in the art.

The routines of FIGS. 2–18 of the present invention were implemented to execute on the participant GPS receiver 26 of the participant subsystem 12 using C as a high-level language. A C compiler, available from Microtec Research, 2350 Mission College Boulevard, Santa Clara, Calif. 95054, was used to generate executable object code from source code corresponding to these routines.

While the present invention has been illustrated by the description of embodiments thereof, and while the embodiments have been described in considerable detail, it is not the intention of the applicant to restrict or in any way limit the scope of the appended claims to such detail. The present invention has been implemented in a real-time computer for providing landing guidance for aircraft in low-weather conditions. The position calculated by the present invention is compared to a desired approach path stored in the real-time computer, and horizontal and vertical deviations are computed.

Additional advantages and modifications will readily appear to those skilled in the art. For example, although three processors 40, 42, and 44 are used in the participant GPS receiver 26 of the participant subsystem 14, a single processor of sufficient processing power might be able to perform all the required tasks associated with the present invention. As another example, deviation or other determined data can be transmitted to a control unit that automatically alters the path of the aircraft or other participant craft. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A satellite receiver and processor unit, comprising:
    (a) a satellite tracker, said satellite tracker tracking satellite signals from a first plurality of satellites, said satellite signals including a satellite code modulated by a carrier signal;
    (b) a navigation processor in circuit communication with said tracker, at least one of said tracker and said navigation processor determining for each satellite of said first plurality of satellites the satellite code and phase of the carrier signal; and
    (c) a telemetry receiver in circuit communication with said navigation processor, said telemetry receiver receiving a telemetry signal from a reference receiver, the telemetry signal including for each satellite of a second plurality of satellites the satellite code and phase of the associated carrier signal, said first and second pluralities of satellites having associated therewith at least one overlapping subset of satellites;

wherein said navigation processor determines that a cycle slip has occurred during tracking of the carrier signal from at least one satellite of said first plurality of satellites by:
    (1) measuring a plurality of actual carrier phase data points for the carrier signal associated with the at least one satellite;
    (2) fitting a polynomial to the plurality of actual phase data points for the at least one satellite;
    (3) extrapolating a predicted next phase measurement data point from the polynomial;
    (4) measuring a next phase data point for the carrier signal associated with the at least one satellite; and
    (5) comparing the predicted next phase measurement data point with the measured next phase data point.

2. A satellite receiver and processor unit, comprising:
    (a) a satellite tracker, said satellite tracker tracking satellite signals from a first plurality of satellites, said satellite signals including a satellite code modulated by a carrier signal;
    (b) a navigation processor in circuit communication with said tracker, at least one of said tracker and said navigation processor determining for each satellite of said first plurality of satellites the satellite code and phase of the carrier signal;
    (c) a telemetry receiver in circuit communication with said navigation processor, said telemetry receiver receiving a telemetry signal from a reference receiver, the telemetry signal including for each satellite of a second plurality of satellites the satellite code and phase of the associated carrier signal, said first and second pluralities of satellites having associated therewith at least one overlapping subset of satellites;
    (1) wherein said navigation processor determines an estimated double difference integer ambiguity for each satellite of said at least one overlapping subset of satellites using a Kalman filter with double difference integer ambiguities added as additional states; and
    (2) wherein said navigation processor determines an integer ambiguity for each satellite of said at least one overlapping subset of satellites using said estimated double difference integer ambiguity for each satellite of said at least one overlapping subset of satellites.

3. A satellite receiver and processor unit according to claim 2 wherein said navigation processor processes estimated double difference integer ambiguities in said Kalman filter until their error estimates are determined to within a predetermined variance.

4. A satellite receiver and processor unit according to claim 2 wherein said navigation processor determines candidate double difference integer ambiguities from said estimated double difference integer ambiguities and further wherein said navigation processor determines double difference integer ambiguities by searching said candidate double difference integer ambiguities in the range domain.

5. A satellite receiver and processor unit according to claim 2 wherein said navigation processor determines candidate double difference integer ambiguities from said estimated double difference integer ambiguities and further wherein said navigation processor determines double difference integer ambiguities by searching said candidate double difference integer ambiguities along the double difference line of sight for each satellite of said at least one overlapping subset of satellites.

6. A satellite receiver and processor unit according to claim 2 wherein:

(a) said navigation processor determines candidate double difference integer ambiguities from said estimated double difference integer ambiguities;

(b) said navigation processor sequentially selects at least one set of candidate double difference integer ambiguities by searching said candidate double difference integer ambiguities along the double difference line of sight for each satellite of said at least one overlapping subset of satellites;

(c) said navigation processor sequentially determines after-the-fit residuals for the at least one selected set of candidate double difference integer ambiguities; and (d) if the after-the-fit residuals for the at least one selected set of candidate double difference integer ambiguities are below a predetermined threshold, then said navigation processor deems the selected set of candidate double difference integer ambiguities to be the double difference integer ambiguities.

7. A satellite receiver and processor unit according to claim 2 wherein said navigation processor sorts the satellites of said at least one overlapping subset of satellites to maximize the angular difference between double difference pairs.

8. A satellite receiver and processor unit according to claim 2 wherein said navigation processor performs a Kalman filter innovations test to determine whether at least one measurement from at least one satellite of said at least one overlapping subset of satellites improves an estimated double difference integer ambiguity or not.

9. A satellite receiver and processor unit according to claim 2 wherein said Kalman filter has a covariance matrix associated therewith and further wherein said navigation processor determines whether there is at least one satellite in a double difference pair whose signal is no longer being tracked and, if so, said navigation processor compresses the covariance matrix thereby removing the at least one satellite whose signal is no longer being tracked.

10. A satellite receiver and processor unit according to claim 2 wherein said navigation processor determines that a cycle slip has occurred during tracking of the carrier signal from at least one satellite of said first plurality of satellites by:

(1) measuring a plurality of actual carrier phase data points for the carrier signal associated with the at least one satellite;

(2) fitting a polynomial to the plurality of actual phase data points for the at least one satellite;

(3) extrapolating a predicted next phase measurement data point from the polynomial;

(4) measuring a next phase data point for the carrier signal associated with the at least one satellite; and (5) comparing the predicted next phase measurement data point with the measured next phase data point.

11. A method of determining that a cycle slip has occurred during tracking of a carrier signal from a satellite, comprising the steps of:

(a) measuring a plurality of actual phase data points for the carrier signal associated with the satellite;

(b) fitting a polynomial to the plurality of actual phase data points for the satellite;

(c) extrapolating a predicted next phase measurement data point from the polynomial;

(d) measuring a next phase data point for the carrier signal associated with the satellite; and (e) comparing the predicted next phase measurement data point with the measured next phase data point.

12. A method of determining integer ambiguities in the distances between a plurality of satellites and a receiver, the satellites transmitting a satellite signal comprising a satellite code modulated by a carrier signal, comprising the steps of:

(a) receiving satellite signals with a participant receiver from a first plurality of satellites;

(b) converting the carrier signals from said satellites of said first plurality of satellites into computer-readable participant carrier phase data;

(c) determining participant satellite code from the signals from said satellites of said first plurality of satellites;

(d) storing time-correlated participant satellite code and participant carrier phase data for each satellite from the first plurality of satellites;

(e) receiving satellite signals with a reference receiver from a second plurality of satellites, said first and second pluralities of satellites having associated therewith at least one overlapping subset of satellites;

(f) converting the carrier signals from said satellites of said second plurality of satellites into computer-readable reference carrier phase data;

(g) determining reference satellite code from the signals from said satellites of said second plurality of satellites;

(h) storing time-correlated reference satellite code and reference carrier phase data for each satellite from said second plurality of satellites;

(i) determining estimated integer ambiguities for each satellite of at least one overlapping subset of satellites of said first and second pluralities of satellites using a Kalman filter with double difference integer ambiguities added as additional states; and (j) determining an integer ambiguity for each satellite of said at least one overlapping subset of satellites using said estimated double difference integer ambiguity for each satellite of said at least one overlapping subset of satellites.

13. A method of determining integer ambiguities in the distances between a plurality of satellites and a receiver according to claim 12 further comprising the step of processing estimated double difference integer ambiguities in said Kalman filter until their error estimates are determined to within a predetermined variance.

14. A method of determining integer ambiguities in the distances between a plurality of satellites and a receiver according to claim 12 further comprising the step of determining candidate double difference integer ambiguities from said estimated double difference integer ambiguities; and wherein said step of determining an integer ambiguity for each satellite of said at least one overlapping subset of satellites comprises searching said candidate double difference integer ambiguities in the range domain.

15. A method of determining integer ambiguities in the distances between a plurality of satellites and a receiver according to claim 12 further comprising the step of determining candidate double difference integer ambiguities from said estimated double difference integer ambiguities; and wherein said step of determining an integer ambiguity for each satellite of said at least one overlapping subset of satellites comprises searching said candidate double difference integer ambiguities along the double difference line of sight for each satellite of said at least one overlapping subset of satellites.

16. A method of determining integer ambiguities in the distances between a plurality of satellites and a receiver according to claim 12 further comprising the step of determining candidate double difference integer ambiguities from said estimated double difference integer ambiguities; and wherein said step of determining an integer ambiguity for each satellite of said at least one overlapping subset of satellites comprises the steps of:

(a) sequentially selecting at least one set of candidate double difference integer ambiguities by searching said candidate double difference integer ambiguities along the double difference line of sight for each satellite of said at least one overlapping subset of satellites;

(b) determining after-the-fit residuals for the at least one selected set of candidate double difference integer ambiguities; and (c) if the after-the-fit residuals for the at least one selected set of candidate double difference integer ambiguities are below a predetermined threshold, then deeming the selected set of candidate double difference integer ambiguities to be the double difference integer ambiguities.

17. A method of determining integer ambiguities in the distances between a plurality of satellites and a receiver according to claim 12 further comprising the step of sorting the satellites of said at least one overlapping subset of satellites to maximize the angular difference between double difference pairs.

18. A method of determining integer ambiguities in the distances between a plurality of satellites and a receiver according to claim 12 further comprising the step of performing a Kalman filter innovations test to determine whether at least one measurement from at least one satellite of said at least one overlapping subset of satellites improves an estimated double difference integer ambiguity or not.

19. A method of determining integer ambiguities in the distances between a plurality of satellites and a receiver according to claim 12 wherein said Kalman filter has a covariance matrix associated therewith and further comprising the step of determining whether there is at least one satellite in a double difference pair whose signal is no longer being tracked and, if so, compressing the covariance matrix thereby removing the at least one satellite whose signal is no longer being tracked.

20. A method of determining integer ambiguities in the distances between a plurality of satellites and a receiver according to claim 12 further comprising the step of determining that a cycle slip has occurred during tracking of the carrier signal from at least one satellite of said first plurality of satellites.

21. A method of determining integer ambiguities in the distances between a plurality of satellites and a receiver according to claim 20 wherein said step of determining that a cycle slip has occurred comprises the steps of:

(a) measuring a plurality of actual carrier phase data points for the carrier signal associated with the at least one satellite;

(b) fitting a polynomial to the plurality of actual phase data points for the at least one satellite;

(c) extrapolating a predicted next phase measurement data point from the polynomial;

(d) measuring a next phase data point for the carrier signal associated with the at least one satellite; and (e) comparing the predicted next phase measurement data point with the measured next phase data point.

22. A method of determining a course correction for a participant receiver, comprising the steps of:

(a) receiving satellite position data with a participant receiver from a first plurality of satellites;

(b) receiving with a telemetry receiver reference position data for a second plurality of satellites, said reference position data being telemetered from a reference receiver;

(c) determining estimated integer ambiguities for each satellite of at least one overlapping subset of satellites of said first and second pluralities of satellites using a Kalman filter, the satellite position data, and the reference position data;

(d) determining integer ambiguities for each satellite of the at least one overlapping subset of satellites from said estimated integer ambiguities by searching along double difference lines of sight between the satellites and the receivers;

(e) determining the present location of the participant receiver using the determined integer ambiguities;

(f) comparing the present location of the participant receiver with a predetermined desired location; and (g) displaying a course correction associated with the difference between the present location and the predetermined desired location of the participant receiver.

23. A computer-readable computer program product comprising a computer readable medium having computer program logic recorded thereon for enabling a processor in a computer system to determine integer ambiguities in the distances between a plurality of satellites and a receiver, the satellites transmitting a satellite signal comprising a satellite code modulated by a carrier signal, said computer program product comprising:

(a) means for determining that a cycle slip has occurred during tracking of the carrier signal from at least one satellite of said first plurality of satellites;

(b) means for sorting the satellites of said at least one overlapping subset of satellites to maximize the angular difference between double difference pairs;

(c) means for performing a Kalman filter innovations test to determine whether at least one measurement from at least one satellite of said at least one overlapping subset of satellites improves an estimated double difference integer ambiguity or not;

(d) means for determining whether there is at least one satellite in a double difference pair whose signal is no longer being tracked and, if so, compressing a covariance matrix associated with said Kalman filter thereby removing the at least one satellite whose signal is no longer being tracked;

(e) means for determining estimated integer ambiguities for each satellite said plurality of satellites using a Kalman filter with double difference integer ambiguities added as additional states;

(f) means for processing estimated double difference integer ambiguities in said Kalman filter until their error estimates are determined to within a predetermined variance;

(g) means for determining an integer ambiguity for each satellite of said plurality of satellites using said estimated double difference integer ambiguity for each satellite of said plurality of satellites;

(h) means for sequentially selecting at least one set of candidate double difference integer ambiguities by searching said candidate double difference integer ambiguities along the double difference line of sight for each satellite of said at least one overlapping subset of satellites;

(i) means for determining after-the-fit residuals for the at least one selected set of candidate double difference integer ambiguities; and (j) means for, if the after-the-fit residuals for the at least one selected set of candidate double difference integer ambiguities are below a predetermined threshold, deeming the selected set of candidate double difference integer ambiguities to be the double difference integer ambiguities.

* * * * *